US008280755B2

(12) United States Patent
Stuhec et al.

(10) Patent No.: US 8,280,755 B2
(45) Date of Patent: Oct. 2, 2012

(54) CONTEXT-SPECIFIC MODELING OF COLLABORATIVE BUSINESS PROCESS

(75) Inventors: Gunther Stuhec, Heidelberg (DE); Dotchka Pentcheva, Berlin (DE)

(73) Assignee: SAP AG, Walldorf (DE)

( * ) Notice: Subject to any disclaimer, the term of this patent is extended or adjusted under 35 U.S.C. 154(b) by 987 days.

(21) Appl. No.: 11/981,492

(22) Filed: Oct. 30, 2007

(65) Prior Publication Data

US 2009/0112655 A1    Apr. 30, 2009

(51) Int. Cl.
*G06F 17/00* (2006.01)
(52) U.S. Cl. ............................. 705/7.11; 705/22; 705/28
(58) Field of Classification Search .................. 705/7.11, 705/22, 28
See application file for complete search history.

(56) References Cited

U.S. PATENT DOCUMENTS

| | | | |
|---|---|---|---|
| 5,444,841 A | 8/1995 | Glaser et al. | |
| 5,630,069 A * | 5/1997 | Flores et al. | 705/7 |
| 5,734,837 A * | 3/1998 | Flores et al. | 705/7 |
| 5,845,289 A * | 12/1998 | Baumeister et al. | 1/1 |
| 5,918,210 A * | 6/1999 | Rosenthal et al. | 705/7 |
| 5,977,967 A * | 11/1999 | Berner et al. | 715/826 |
| 6,073,109 A * | 6/2000 | Flores et al. | 705/8 |
| 6,272,482 B1 * | 8/2001 | McKee et al. | 706/47 |
| 6,308,161 B1 * | 10/2001 | Boden et al. | 705/7 |
| 6,408,311 B1 * | 6/2002 | Baisley et al. | 1/1 |
| 6,560,608 B1 | 5/2003 | Tomm et al. | |
| 6,662,237 B1 | 12/2003 | Leckie | |
| 6,694,338 B1 | 2/2004 | Lindsay | |
| 6,742,015 B1 * | 5/2004 | Bowman-Amuah | 718/101 |
| 6,757,739 B1 | 6/2004 | Tomm et al. | |
| 7,065,566 B2 * | 6/2006 | Menard et al. | 709/223 |
| 7,155,665 B1 | 12/2006 | Browne et al. | |
| 7,194,695 B1 | 3/2007 | Racine et al. | |
| 7,418,459 B2 * | 8/2008 | Gupta | 1/1 |
| 7,506,302 B2 * | 3/2009 | Bahrami | 717/100 |
| 7,533,103 B2 * | 5/2009 | Brendle et al. | 1/1 |
| 7,533,366 B2 * | 5/2009 | Gupta et al. | 717/105 |
| 7,613,671 B2 * | 11/2009 | Serrano-Morales et al. | 706/47 |
| 7,716,254 B2 * | 5/2010 | Sarkar et al. | 707/803 |
| 7,865,467 B2 | 1/2011 | Bastable et al. | |
| 7,865,677 B1 | 1/2011 | Duprey et al. | |
| 7,865,900 B2 | 1/2011 | Aakolk et al. | |
| 8,005,792 B2 * | 8/2011 | Green et al. | 707/638 |
| 2002/0116389 A1 | 8/2002 | Chen et al. | |

(Continued)

OTHER PUBLICATIONS

"Adobe LiveCycle Designer FAQ" Adobe Systems Incorporated, 3 pages, 2004.

(Continued)

*Primary Examiner* — Calvin L. Hewitt, II
*Assistant Examiner* — John M Winter
(74) *Attorney, Agent, or Firm* — Fish & Richardson P.C.

(57) ABSTRACT

Among other disclosure, a computer-implemented method for context-specific modeling of a collaborative business process includes receiving an identification of a collaborative business process to involve a communication between at least two entities. The identification is submitted by an entity seeking to model the collaborative business process for a specific context associated with the entity. The method includes selecting, in a repository and using the specific context, at least one modeling artifact that has been defined for use in the identified collaborative business process. The repository includes a plurality of stored modeling artifacts for at least one collaborative business process, each of the stored modeling artifacts associated with at least one context value. The method includes providing the selected modeling artifact to the entity in response to the received identification.

21 Claims, 9 Drawing Sheets

U.S. PATENT DOCUMENTS

2002/0120506 A1  8/2002  Hagen
2005/0198074 A1  9/2005  Khater et al.

OTHER PUBLICATIONS

"Chomsky's Revolution in Linguistics" [online]. The New York Review of Books, 1972, [retrieved on Sep. 12, 2005]. Retrieved from the Internet: <URL: http://www.chomsky.info/onchomsky/19720629.htm>.
Kifer, M. et al., "Logical Foundations of Object-Oriented and Frame-Based Languages"; *J. Assoc Computing Machinery*, May 1995, pp. 1-100.
Decker S., et al., "ONTOBROKER: Ontology based Access to Distributed and Semi-Structured Information". *Kluwer Academic Publishers*, 1998. pp. 1-20.
"How to Solve the Business Standards Dilemma—CCTS Key Model Concepts", *The SAP Developer Network* (SAP AG, 2006). pp. 1-18.
"How to Solve the Business Standards Dilemma—The Context Driven Business Exchange", *The SAP Developer Network* (SAP AG 2005). pp. 1-19.
'Know How to Use Know-How' [online]. Ontoprise, 2006, [retrieved on Mar. 10, 2007]. Retrieved from the Internet: <URL: http://web.archive.org/web/20060208064330/www.ontoprise.de/content/index_eng.html>.
'OntoBroker—The Power of Inferencing' [online]. Ontoprise, 2005, [retrieved on Mar. 10, 2007]. Retrieved from the Internet: <URL: http://web.archive.org/web/20051122071757/www.ontoprise.de/content/e3/e27/index_eng . . .>.
Kifer, M., "F-Logic: A Higher-Order Language for Reasoning about Objects, Inheritance, and Scheme" (Jun. 3, 1997). pp. 1-21.
Stuhec, G. and Crawford, M., "How to Solve the Business Standards Dilemma—The CCTS Standards Stack". (SAP AG 2006). pp. 1-13.
Stuhec, G., "How to Solve the Business Standards Dilemma—The CCTS based Core Data Types" (SAP AG 2006). pp. 1-22.
"Adobe LiveCycle Designer FAQ" *Adobe Systems Incorporated*, document undated, 3 pages.
"Core Components Technical Specification V2.01—Part 8 of the ebXML Framework" for UN/CEFACT, Nov. 15, 2003, pp. 1-113.
XForms 1.1, W3C Working Draft Nov. 15, 2004, Obtained from the Internet at http://www/w3.org/TR/2004/WD-xforms11-20041115, on Dec. 6, 2004, 26 pages.
XML Schema, W3C, Obtained from the Internet http://www.w3.org/XML/Schema on Jan. 3, 2005, 16 pages.
XForms—The Next Generation of Web Forms, W3C, obtained from the Internet at http://www.w3.org/MarkUp/Forms, on Jan. 3, 2005, 11 pages.
XML Path Language (XPath) Version 1.0—W3C Recommendation Nov. 16, 1999, W3C, Obtained from the Internet at http://www.w3.org/TR/xpath, on Jan. 3, 2005, 37 pages.
InfoPath 2003 Product Overview, Microsoft Office Online, Obtained from the Internet at http://www/microsoft.com/office/infopath/prodinfo/overview.mspx, on Jan. 4, 2005.
Davis, J., *Context Tailor: Towards a Programming Model for Context-Aware Computing*, International Middleware Conference Workshop Proceedings—Middleware for Pervasive and Ad Hoc Computing, Jun. 16-20, 2003, Rio de Janeiro, Brazil, 68-75, 2003.
Oasis ebXML Registry TC[online], Oasis, 2005 [retrieved on Mar. 23, 2005]. Retrieved from the Internet: <URL: http://www.oasis-open.org/committees/tc_home.php?wg_abbrev=regrep>.
GoXML Registry [online], Xenos, 2002 [retrieved on Mar. 23, 2005]. Retrieved from the Internet: <URL: http://www.xmlglobal.com/solutions/prod_goxml_registry.asp>.
The Company of the Open Standard Solutions [online], ebXMLsoft Inc., 2001-2004 [retrieved on Mar. 23, 2005]. Retrieved from the Internet: <URL: http://www.ebsmlsoft.com/>.
Project: ebXML Registry/Repository: Summary [online], SourceForge.net, 2005 [retrieved on Mar. 23, 2005]. Retrieved from the Internet: <URL: http://sourceforge.net/projects/ebsmlrr >.
AnHai Doan, Jayant Madhaven, Pedro Domingos, and Alon Halevy, "Learning to Map between Ontologies on the Semantic Web," May 2002, *Proceedings of the 11th International World Wide Web Conference*, pp. 662-673.
L. M. Haas, R. J. Miller, B. Niswonger, M. Tork Roth, P. M. Schwarz, and E. L. Wimmers, "Transforming Heterogeneous Data with Database Middleware: Beyond Integration," Copyright 1997, *Computer Society Technical Committee on Data Engineering*, pp. 1-6.
Hong-Hai Do and Erhard Rahm, "COMA—A system for flexible combination of schema matching approaches," Aug. 2002, *Proc. 28th Intl. Conference on Very Large Databases (VLDB)*, Hongkong, pp. 1-12.
Hong-Hai Do, Sergey Melnik, and Erhard Rahm, "Comparison of Schema Matching Evaluations," Oct. 2002, *Proc. GI-Workshop* "Web and Databases", Erfurt, pp. 1-15.
Jayant Madhavan, Philip A. Bernstein, and Erhard Rahm, "Generic Schema Matching with Cupid," 2001, *Proceedings of the 27th VLDB Conference*, pp. 49-58.
Jayant Madhaven, Philip A. Bernstein, and Erhard Rahm, "Generic Schema Matching with Cupid," Aug. 2001, *Microsoft Research*, MSR-TR-2001-58, pp. 1-15.
Sergey Melnik, Hector Garcia-Molina, and Erhard Rahm, "Similarity Flooding: A Versatile Grraph Matching Algorithm and its Application to Schema Matching," 2002, *Proc. 18th Int'l Conf. on Data Engineering (ICDE)*, pp. 1-12.
Lucian Popa, Yannis Velegrakis, Renee J. Miller, Mauricio A. Hernandez, Ronald Fagin, "Translating Web Data," 2002, *The Eleventh International WWW Conference*, pp. 1-12.
Hong Su, Harumi, Kuno, and Elke A. Rundensteiner, "Automating the Transformation of XML Documents," 2001, *The ACM Digital Library*, pp. 68-75.
http://www.flexisoftsolutions.com/Products/SM2004/SM2004. aspx—FlexiSoft Solutions, obtained from the Internet on Jun. 24, 2005, 4 pages.
http://ww.notes.queensu.ca/uisadmin.nsf/579a5e3cc0e046c085256833007715cc/$FILE/queries_guide. pdf—BI/Query Queries Guide, *Hummingbird, Ltd.*, obtained from the Internet on Jul. 18, 2005, 6 pages.
"Final Committee Draft ISO/IED FCD—Information technology—Metadata registries (MDR)—Part 5: Naming and identification principles" *ISO/IEC*, document dated Jan. 8, 2004, 26 pages.
Goyal, "An XML Schema Naming Assister for Elements and Types," *National Institute of Standards and Technology*, document obtained at http://www.mel.nist.gov/msidlibrary/doc/NISTIR7143.pdf on Jun. 24, 2005, 12 pages.
"Information technology—Metadata registries (MDR)—Part 4: Formulation of data definitions," *ISO/IEC*, document dated Jul. 15, 2004, 16 pages.
"Information technology—Specification and standardization of data elements—Part 5: Naming and identification principles for data elements," *ISO/IEC*, document dated Dec. 1, 1995, 20 pages.
GEFEG EDIFIX, "EDIFIX Functions," [online], Xenos, 2002 [retrieved on Nov. 30, 2005]. <URL: http://www.gefeg.com/en/edifix/fx_functions.htm>.
"Information technology—Metadata Registries (MDR)—Part 1: Framework" International Standard ISO/IEC 11179-1; Sep. 15, 2004; (32 pages).
"Information technology—Metadata Registries (MDR)—Part 2: Classification"; International Standard ISO/IEC 11179-2; Nov. 15, 2005 (16 pages).
"Information technology—Metadata Registries (MDR)—Part 3: Registry Metamodel and Basic Attributes"; International Standard ISO/IEC 11179-3; Feb. 15, 2003 (108 pages).
"Information Technology—Metadata Registries (MDR)—Part 4: Formulation of Data Definitions" International Standard ISO/IEC 11179-04; Jul. 15, 2004 (16 pages).
"Information Technology—Metadata Registries (MDR)—Part 5: Naming and Identification Principles"; International Standard ISO/IEC 11179-5; Sep. 1, 2005.
"Information Technology—Metadata Registries (MDR)—Part 6: Registration". International Standard ISO/IEC 111790-6; Jan. 15, 2005.
ebXML Business Process Specification Schema Version 1.01 [online]. Oasis 2001, [retrieved on Mar. 21, 2006]. Retrieved from the Internet: <URL: http://www.ebxml.org/specs/ebBPSS.pdf>.

UN/CEFACT's Modeling Methodology (UMM) in a Nutshell, undated manuscript, believed to have been published Nov. 15, 2006. http://www.untmg.org/index.php?option=com_docman@task=docclick&Itemid=137&bid=55&limitstart=0&limit=5.

UN/CEFACT's Modeling Methodology (UMM): UMM Meta Model—Foundation Module Version 1.0 Technical Specification [online].; CEFACT Oct. 6, 2006. Retrieved from the Internet: <URL: http://www.unece.org/cefact/umm/UMM_Foundation_Module.pdf.

"Business Process Modeling Notation (BPMN) Information" [online]. OMG/BPMN [retrieved on Oct. 11, 2006]. Retrieved from the Internet: <URL: http://web.archive.org/web/20061011235521/http://www.bpmn.org/.

"Architecture of Integrated Information Systems" [online]. Wikipedia [retrieved on Oct. 30, 2007]. Retrieved from the Internet: <URL: http://en.wikipedia.org/wiki/Architecture_of_Integrated_Information_Systems.

Chen et al., "Managing Semantic Metadata Grid for the Semantic Grid," *Proceedings of the Knowledge Grid and Grid Intelligence Workshop*, Beijing, China, 2004, 9 pages.

Tao et al., "Applying the Semantic Web to Manage Knowledge on the Grid," *E-Science AHM*, 2004, Nottingham, England, 8 pages.

Tao et al, "Semantic Web Based Content Enrichment and Knowledge Reuse in E-science," *On the Move to Meaningful Internet Systems 2004: CoopIS, DOA, and ODBASE*, 2004, 14:654-669.

Peng and Law, "A Reference Data Model for Neesgrid Shake Table Experiments," *Proceedings of the International Symposium on Earthquake Engineering in the Past and Future Fifty Years*, 2004, 10 pages.

Britton, Chris. "Data Management and Context Modeling." The Data Administration Newsletter—TDAN.com, Jan. 1, 2007 [Retrieved on Jan. 5, 2011]. Retrieved from the Internet <URL: http://www.tdan.com/view-articles/4586> (2 pages).

Hong, Chung-Seung, Hung-Sun Kim, Joonmyun Cho, Hyun Kyu Cho, and Hyun-Chan Lee. "Context Modeling and Reasoning Approach in Context-Aware Middleware for URC System." World Academy of Science, Engineering and Technology 32, 2007 (5 pages).

SAP AG. "How to Solve the Business Standards Dilemma—The Context Driven Business Exchange." The SAP Developer Network, 2005. (19 pages).

UnixSpace. "Database Models." UnixSpace.com [Retrieved on Jan. 5, 2011]. Retrieved from the Internet <URL: http://www.unixspace.com/context/databases.html> (5 pages).

* cited by examiner

| Responsibilities 502 | Business Expert | | Business Modeler | | Technical Expert |
|---|---|---|---|---|---|
| Architecture Views 504 | Business Domain View | Business Requirements View | Business Transaction View | Business Information View | Business Service View |
| Activities 506 | • Query the Repository<br>• Start creating a Contract<br>• Business Process Requirements<br>• Set and apply Business Context<br>• Analyze Business Domain View | • Modify and narrow the Context by defining a Business Process Activity Model<br>• Discovery – Business Collaboration and Transaction Requirements<br>• Set and apply Business Context<br>• Analyze Business Requirements View | • Modify and narrow the Realization of the Context Values of the Business Requirements into Business Choreography and Business Interaction<br>• Discovery – Business Collaboration Protocol and Business Transaction<br>• Analyze Business Transaction View | • Data Modeling (CCTS Modeler Tool) | • Serialization to BPEL (in process) |

FIG. 5

CONTEXT-SPECIFIC MODELING OF COLLABORATIVE BUSINESS PROCESS

TECHNICAL FIELD

This document relates to context-specific modeling of a collaborative business process.

BACKGROUND

United Nations Center for Trade Facilitation and Electronic Business (UN/CEFACT) has approved and distributed a version 2.01 of a document titled "Core Components Technical Specification—Part 8 of the ebXML Framework". The Core Components specification presents a methodology for developing a common set of building blocks, or core components, for standardizing business transactions between business partners and across industries. The core components define the exchanged information in terms of its semantic and structure and represent the general types of business data in use today.

The UN/CEFACT core components are based on class diagrams using the Unified Modeling Language (UML). A basic core component constitutes a singular business characteristic. In contrast, a broader concept consists of several components that can be individually varied and is therefore called an aggregate core component, because it is a collection of related pieces of business information. Association core components represent associations between different core components. Thus, any core component is generally classified as being either a basic, an aggregate or an association core component. In addition, the type of information that a basic core component may contain is defined through a core component type. Core component types have no business semantic (meaning).

While all core components bear specific semantics, none of them carry any notion of the business context in which they are to be used. Rather, for every specific business context the core component takes the form of a piece of business data called a business information entity. Like core components, the business information entities come in the three flavors basic, aggregate and association, which have essentially the same meaning here. Thus, every business information entity is based on a core component and is intended for use in a specific business context. The business information entity contains a narrower definition than the corresponding core component, may have fewer properties, and the allowed values of properties may be restricted. The names of business information entities can be derived by adding a qualifier to the name of the corresponding core component.

A modeling methodology has been defined based on the UN/CEFACT standard. It is called UN/CEFACT Modeling Methodology (UMM). The UMM is a UML-based modeling approach that can be used with service-oriented architectures.

The exchange of access-to-archive (A2A) or business-to-business (B2B) messages can depend on the status, progress and behavior of a collaborative business process. Such a process can require a party to inform one or more other about actions and commonly to process actions such as creating, deleting or changing business information to be exchanged.

SUMMARY

The invention relates to context-specific modeling of a collaborative business process.

In a first aspect, a computer-implemented method for context-specific modeling of a collaborative business process includes receiving an identification of a collaborative business process to involve a communication between at least two entities. The identification is submitted by an entity seeking to model the collaborative business process for a specific context associated with the entity. The method includes selecting, in a repository and using the specific context, at least one modeling artifact that has been defined for use in the identified collaborative business process. The repository includes a plurality of stored modeling artifacts for at least one collaborative business process, each of the stored modeling artifacts associated with at least one context value. The method includes providing the selected modeling artifact to the entity in response to the received identification.

Implementations can include any, all or none of the following features. The identified collaborative business process can include multiple modeling artifacts stored in the repository, and any of the multiple modeling artifacts associated with the specific context can be selected and provided to the entity in the response. The identified collaborative business process can be defined in the repository to involve multiple communications between the at least two entities, and each of the multiple modeling artifacts can be defined to be included in at least one of the multiple communications. The entity can modify the provided modeling artifact, and the method can further include updating the repository based on the modified modeling artifact. Updating the repository can include determining whether the modified modeling artifact already is stored in the repository. The determination can indicate that the modified modeling artifact is already stored in the repository and is associated with another specific context, and updating the repository can include associating the already stored modified modeling artifact also with the specific context. The method can further include thereafter receiving another identification of the collaborative business process to provide any modeling artifact thereof associated with the specific contest, and providing at least the modified modeling artifact in response to the other identification. The determination can indicate that the modified modeling artifact is not already stored in the repository, and the method can further include storing the modified modeling artifact in the repository. The modeling artifact can include at least one data element configured for use in assigning an information category to a value in the communication. The modeling artifact can conform to a standardized protocol for defining semantics of contents in electronic communications. The specific context can be provided by the entity in connection with submitting the identification. The specific context can not be explicitly provided with the identification, and the method can further include determining the specific context based on at least an identity of the entity. The identification can include a natural language phrase. The method can further include analyzing the natural language phrase to identify the collaborative business process. Each of the modeling artifacts in the repository can provided with at least one name according to a naming convention, and at least one of the names can be used in analyzing the natural language phrase. The method can further include providing the repository with the plurality of stored modeling artifacts before the at least one modeling artifact is selected in the repository, the plurality of stored modeling artifacts being stored as a free tree that has a plurality of nodes associated with at least one context value each, wherein the free tree has no root node. Selecting the at least one modeling artifact in the repository can include: selecting, as a root node, one of the plurality of nodes whose at least one context value matches the specific context; and deriving a context-specific root tree from the free tree based on the selected root node, wherein nodes of the context-specific root tree have respective context values that are subsets of the at least one context value of the selected root node.

In a second aspect, a computer program product is tangibly embodied in a computer-readable medium and includes instructions that when executed by a processor perform a method for context-specific modeling of a collaborative business process. The method includes receiving an identification of a collaborative business process to involve a communication between at least two entities. The identification is submitted by an entity seeking to model the collaborative business process for a specific context associated with the entity. The method includes selecting, in a repository and using the specific context, at least one modeling artifact that has been defined for use in the identified collaborative business process. The repository includes a plurality of stored modeling artifacts for at least one collaborative business process, each of the stored modeling artifacts associated with at least one context value. The method includes providing the selected modeling artifact to the entity in response to the received identification.

In a third aspect, a repository tangibly embodied in a computer-readable medium includes a definition of a collaborative business process to involve at least one communication between at least two entities. The repository includes definitions of a plurality of modeling artifacts for use in the collaborative business process, each of the modeling artifacts associated with at least one context value. The repository is configured so that any of the modeling artifacts associated with a specific context are selected and provided to an entity for modeling the collaborative business process, the specific context associated with the entity.

Implementations can include any, all or none of the following features. The collaborative business process can be defined to involve multiple communications between the at least two entities, and each of the plurality of modeling artifacts can be defined to be included in at least one of the multiple communications. The entity can modify at least one modeling artifact provided from the repository, and an approach of updating the repository can be chosen based on whether the modified modeling artifact already is stored in the repository. Each of the modeling artifacts can be provided with at least one name according to a naming convention, and the entity can identify the collaborative business process to the repository using a natural language phrase which is analyzed using at least one of the names to identify the collaborative business process. The modeling of the collaborative business process can be done using a plurality of views, each of the views being accessible using at least one of a plurality of roles. The plurality of views can include at least a business domain view, a business requirements view, a business transaction view, a business information view, and a business expert view. The plurality of roles can include at least a business expert role, a business modeler role and a technical expert role.

Implementations can provide any, all or none of the following advantages: Providing methods, systems and/or repositories that address the fundamental and definable aspects required for an Open-edi business transaction, which are derived from the fields of accounting and economics. Provide closing of the formal gap between a modeling methodology side and an economics and accounting side. Providing that each artifact from the business process methodology has an equivalent. Providing that that the economic effect for "give and take" can be retraced in the business process methodology. Improved modeling of a collaborative business process can be provided. Modeling can be improved using a repository of artifacts. A repository of modeling artifacts can be flexibly updated to encompass a context-specific extension. Providing context-specific modeling of a collaborative business process which can be defined by a modeling methodology at a semantic level for collaborative business processes such as UMM. Providing higher and/or more precise reusability of collaborative business process artifacts using a context driven approach. Providing unambiguous and understandable semantic meaning of each collaborative business process artifact, because semantics are defined by a naming convention and will be considered in the specific categories of business context. Providing collaborative sharing of knowledge that allows a user to ascertain "who has used which collaborative business process artifact in which context, and how can it/they be reused in a present context, or can it/they be modified in the present context, and are these modifications already available in other contexts?"

The details of one or more embodiments are set forth in the accompanying drawings and the description below. Other features and advantages will be apparent from the description and drawings, and from the claims.

DESCRIPTION OF DRAWINGS

FIG. 5 schematically shows responsibilities, architecture views and activities relating to context-driven modeling of a collaborative business process.

Like reference symbols in the various drawings indicate like elements.

DETAILED DESCRIPTION

Figure 1:
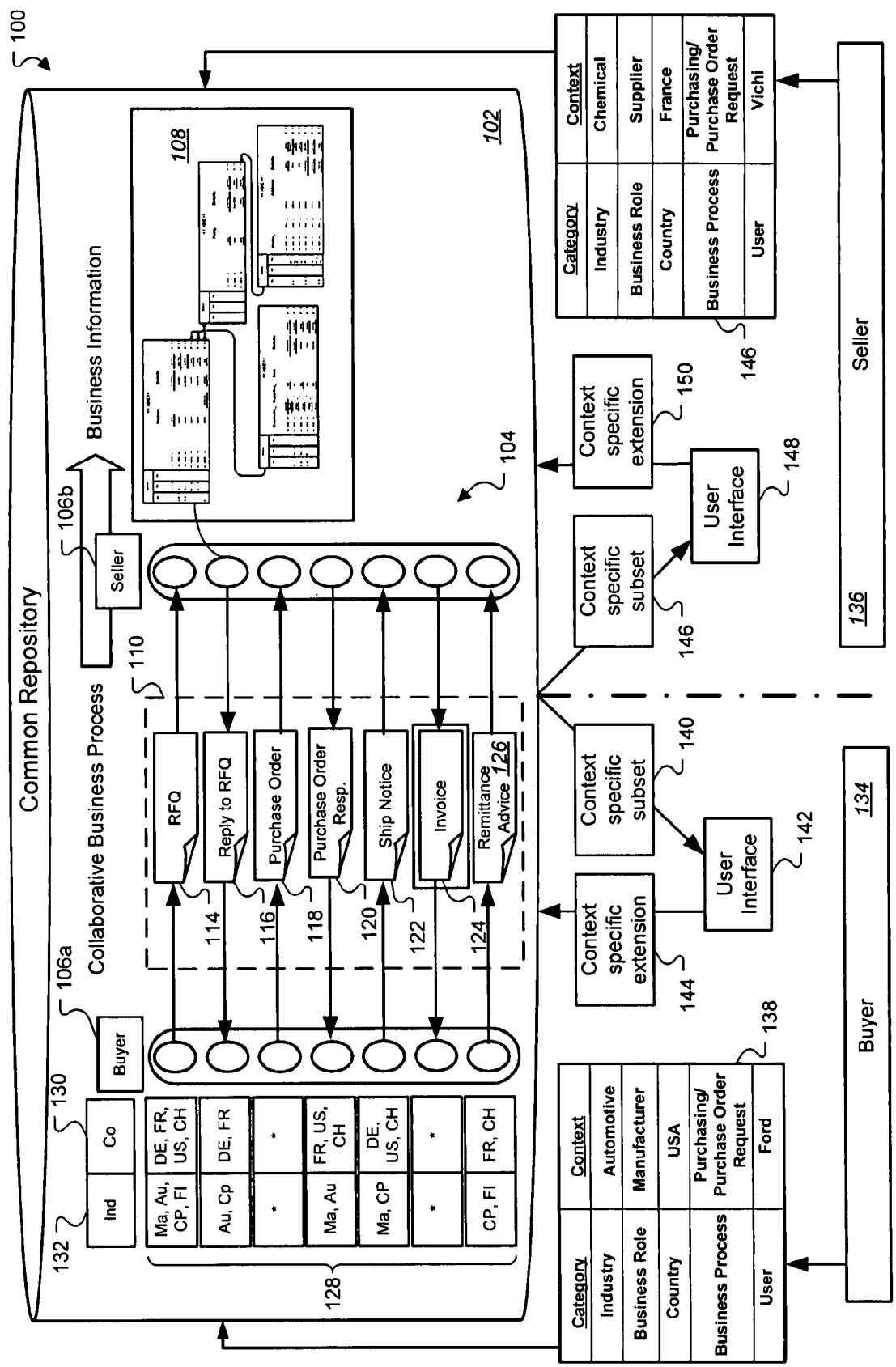
FIG. 1 shows an example system that can be used by parties seeking to engage in a collaborative business process.

FIG. 1 shows an example system 100 that can be used by parties seeking to engage in one or more collaborative business processes. For example, a collaborative business process can include a set of cross-organizational activities for mutually or unilaterally creating values for the parties. In the depicted example, the system 100 includes a common repository 102 accessible by the parties. The common repository 102 stores at least one context-specific collaborative business process model 104. Based on the context-specific collaborative business process model 104, the common repository 102 can provide information to a party, such as one or more modeling artifacts, based on a context associated with the accessing party. In some examples, the common repository 102 also can be updated with modeling modifications from at least one of the parties to adjust the model 104.

The collaborative business process model 104 includes modeling artifacts. Each modeling artifact can unambiguously comprise one or more semantic aspects that are part of the collaborative business process. Such semantic aspects can describe the behavior and/or information of the collaboration between business partners according to their specific business requirements in a given business context. The artifact could be a simple part such as a business transaction or could be a complex part in which several simple parts and/or complex parts could be assembled.

For example, the modeling artifacts can be a whole document, such as an invoice, or they can include one or more data components, such as a buyer address. The modeling artifacts can be conformed to a standardized protocol (e.g., the UN/CEFACT Modeling Methodology (UMM)). In this example, the modeling artifacts are defined relative to business partners 106a, 106b that are involved in the collaborative business process. As shown, the collaborative business process model 104 may associate the business partners 106a, 106b with one or more modeling artifacts. For example, the model 104 may associate the business partners 106a, 106b with data elements and global data types, such as a data element structure 108, to be used by the business partners 106a, 106b.

As shown in FIG. 1, the collaborative business process model 104 includes at least one business process 110 that can be performed by the business partners 106a, 106b. Other business processes involving more or fewer than two parties can also be modeled in the common repository 102. For example, a business process of buying a football player can include a buying team, a selling team, the player, and the player's agent in the given context, such as a specific industry and country.

The business process 110 includes business transaction messages, such as a request for quote (RFQ) message 114, a reply to RFQ message 116, a purchase order 118, a purchase order response message 120, a ship notice 122, an invoice 124, and a remittance advice 126, between the buyer party and the seller party. For example, data structures identified and/or analogous to the data element structure 108 can be included in each of the business transaction messages 114, 116, 118, 120, 122, 124. For example, the buyer party 106a can retrieve the artifacts 108 to its own system and there use them to model and thereafter execute one of the business processes 110. As noted, such a process can require the buyer party 106a to send the purchase order 118 to the seller party 106b to confirm a purchase of goods and services.

In some embodiments, the model 104 can store the business processes 110 in a specific order that reflects an actual order of occurrence of the business transactions. For example, the business process 110 for a buyer may involve first sending the RFQ 114 to the seller, second receiving a RFQ from the seller, third sending a purchase order, forth receiving a purchase order response, fifth sending a shipping notice, sixth receiving an invoice, and finally sending a remittance advice. Other ways of storing the process or its artifacts are possible. For example, artifacts can be organized according to their semantics, such as by grouping all artifacts relating to the buyer or to the purchased goods.

The exemplary business process 110, the business transaction messages 114, 116, 118, 120, 122, 124 and components thereof are modeling artifacts of the model 104. In some embodiments, some or all of the modeling artifacts may be context categorized. In this example, at least some of the modeling artifacts 114, 116, 118, 120, 122, 124 are classified by one or more context values 128 assigned to a country context category 130 and an industry context category 132. Based on the assigned context values 128, the common repository 102 can determine a relevance of the modeling artifacts 114, 116, 118, 120, 122, 124. For example, the common repository 102 may select relevant modeling artifacts by matching a set of context values of a user and the context values 128 of the modeling artifacts 114, 116, 118, 120, 122, 124. Other context categories can be used. For example, common repository 102 can use a business process, a product classification, official constraints, a business process role, a supporting role, and a system capabilities context categories.

Here, a buyer 134 and a seller 136 are users of the system 100. The users 134, 136 can access the common repository 102 and retrieve all or part of the collaborative business model 104 to be used in one or more business processes. In some embodiments, the common repository 102 can include registry functions for accessing the modeling artifacts of the collaborative business model 104. For example, the buyer 134 and the seller 136 can query and download the appropriate specialization of business data models that are relevant to a specified business context. As an illustrative example, the buyer 134 submits an identification 138 to the common repository related to a business communication with the seller 136. Here, the identification 138 indicates that the buyer 134 is a manufacturer in the USA of the automotive industry. Also, the identification 138 indicates that the buyer name is Ford and is requesting artifacts relating to a purchasing or a purchase order request.

After receiving the identification 138, the common repository 102 can select at least one artifact that is specialized using the provided context values. For example, the common repository 102 can select and/or generate a context specific subset 140 of modeling artifacts related to purchasing or purchasing order request. The context specific subset 140 can be output to a user interface 142 of the buyer 134. In some embodiments, the USA automotive manufacturer 134 can use the provided artifacts directly. In some examples, the party can modify the provided artifacts according to business requirements using the user interface 142. For example, the buyer 134 can modify the provided artifacts by making changes to the purchase order or the invoice before implementing the collaborative business process.

In some embodiments, the buyer 134 can upload a context specific extension 144 to the common repository 102. In some examples, the context specific extension 144 includes one or more context-specific modifications of the provided artifacts. By uploading, the context-specific modifications can be made publicly available for business partners in the automotive industry as well as other users. For example, assume in another situation that the seller 136 is instead a cosmetic supplier in France. If the seller 136 requires one or more specific artifacts that correspond to the context specific extension 144 created by the buyer 134, the seller 136 can retrieve the extension 144 by providing an identification 146. For example, the seller 136 can receive a context specific subset 146 that includes the extension 144. In other words, the repository 102 provides the extension 144 to the seller 136 upon determining that it meets the seller's needs.

In some embodiments, the common repository 102 can modify the context values 128 associated with the extension 144 with the context values of the buyer 134 so that other users can know that the extension 144 can be used in more than one context. For example, context values relating to the buyer's industry can be added to the extension 144. Using a user interface 148, the seller 136 can further modify the context specific subset 146 and upload the modifications to the common repository 102 as a context specific extension 150. That extension 150 can then similarly be made available to others.

In certain implementations, the common repository 102 can determine whether a modified modeling artifact is stored in the repository 102. For example, the common repository 102 can receive a context specific extension 150 from the seller 136 that is already stored in the repository 102. Then the common repository 102 can update the stored model(s) by associating the already stored modified modeling artifact(s) with the specific context of the seller 136.

Figure 2:
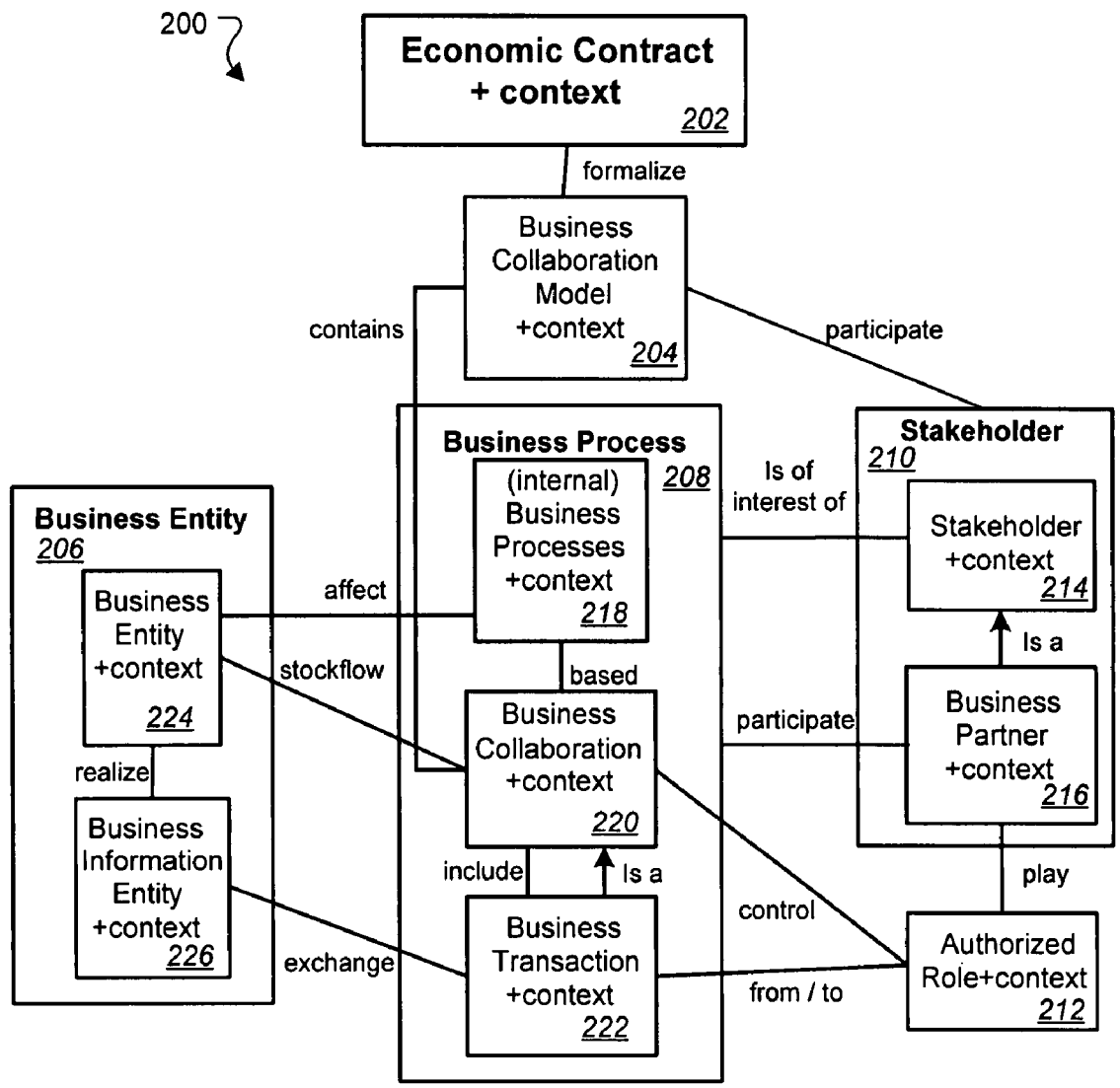
FIG. 2 shows an example model of a collaborative business process.

FIG. 2 shows an example model 200 of a collaborative business process. For example, the model 200 can be generated based on a Resources-Events-Agents (REA) ontology. In one example, the REA framework may model collaborative business processes by listing artifacts or objects that are expected to occur in a business collaboration. For example, the common repository 102 can store the model 200. The model 200 includes multiple modeling artifacts, such as an economic contract 202, a business collaboration model 204, a business entity 206, a business process 208, a stakeholder 210, and an authorized role 212. In this example, "+context" properties may indicate one or more additional business context constructs required in the modules for context specific categorization.

In some embodiments, the economic contract 202 is a grouping of rules to specify the rights and obligations of the participating parties. For example, the economic contract 202 can be or represent a real world contract between the buyer 134 and the seller 136. In some examples, the rules in the economic contract 202 can be formalized in a form of required business transactions. For example, the business transactions can be transmission of a purchase order from a buyer to a seller. In some embodiments, the business transactions can include the economic contract 202 or other messages or documents based on the economic contract 202. In some examples, business parties can use artifacts stored in the common repository 102 to construct a context-specific economic contract. In certain implementations, the economic contract 202 may be an electronic contract that is defined using standardized naming conventions and rules.

The business collaboration model (BCM) 204 represents a group of models that are generated by formalizing the economic contract 202 between business parties in a given business context. In one example, the BCM 204 can include one or more of the participating stakeholders 210 of the economic contract 202 and one or more of the business processes 208. In some examples, some of the defined stakeholders 210 may not actively participate in execution of the business processes 208. In the depicted example, the stakeholders 210 include one or more context-specific stakeholders 214 and one or more context-specific business partners 216. For example, the context-specific stakeholders 214 can include one or more people or organizations that have an interest in the outcome of the business processes 208. For example, the context-specific business partner 216 can be an organization, an organizational unit, or a person that participates in a business process. In general, the business partners 216 may provide input to and/or receive output from the business processes 208. In some examples, the business partners 216 may be a subset of the stakeholders 214 because the business partner 216 participates in the business process 208 and has an interest in the business process 208.

In some embodiments, each of the business processes 208 includes a set of related activities that create value for the business partner. For example, the business process 110 (FIG. 1) includes activities for the buyer party 106a, such as transmitting the RFQ message 114, receiving a reply to RFQ message 116, transmitting the purchase order 118, receiving the purchase order response 120, transmitting the shipping notice 122, receiving the invoice 124, and transmitting the remittance advice 126. The business process 208 includes internal (e.g., inter-organizational) business processes 218 and collaborative (e.g., cross-organizational) business processes 220. The collaborative business process 220 can be a common business process performed by more than two business partners. In some implementations, the collaborative business processes 220 include one or more binary business collaborations or business transactions 222.

The business transactions 222 can be a basic building block for defining choreography between the authorized roles 212. In some embodiments, (e.g., according to UMM), any or all of the business transactions 222 can be the smallest piece to be used in a business collaboration. In some embodiments, the business transactions 222 include one-way business transactions and/or two-way business transactions, at a business semantic level. For example, the one-way business transaction can be a transaction from an initiating party to a reacting party without requiring (or perhaps even permitting) a response. As another example, the two-way business transaction can be a transaction requiring a response from the reacting party. In some examples, a business party can use a one-way business transaction to transmit information, such as contact information or a catalog, to another party. In some examples, a business party can use one-way business transaction to transmit notification, such as a parking ticket, to another party. For example, a recipient of the parking ticket may not be required to respond to the initiator (e.g., the parking enforcement agency). Instead, the initiator may require the parking ticket recipient to pay the parking ticket to a bank. Two-way business transactions can have an identical or similar semantic behavior. Two-way business transactions can include a request-response transaction, a query-response transaction, a request-confirm transaction, a commercial transaction, and/or a query, to name a few examples. Such and other exemplary transactions can define the rights and obligations of the initiating parties and/or the reacting parties. For example, if a party having any of the authorized roles 212 recognizes an event that changes a state of a business object, the party with the authorized role 212 can initiate a business transaction to synchronize with other collaborating business partners. In some embodiments, the authorized role 212 can be a role that reuses the artifacts created by participating business partners in the business transaction 222. The authorized role 212 may be mapped to a certain business partner that plays this role in the business collaborative business process 220.

The business entity 206 includes one or more context-specific business entities 224 and one or more context-specific business information entities 226. In some embodiments, the business entity 224 is the implementation of the business information entity 226. For example, the business information entity 226 may be the module or template from which to create the business entity 224. In some embodiments, the business information entity 226 can realize structured business information that is exchanged between the authorized roles 212 performing activities in the business transaction 222.

Relevant artifacts of the collaborative business process model 200 can include a property that defines a business context. For example, the business context can be represented by a set of context values that are provided by an assigned number of context value sets and differentiated by approved context categories.

In one example, the business context can include context categories, a context entity, a context value set, and context values. The context categories may allow users to uniquely identify and distinguish between different business contexts. In some embodiments, a number of context categories may be identified. For example, each of the identified context categories may use a standard classification to represent context values for the category. In some examples, the context categories can use constraint rules for identifying and distinguishing contexts. Each of the context categories may include one or more context entities. For example, the context entities are based on types that include predefined code lists or identifier schemes. In some embodiments, each type of the context entity may refer to one or more of the context value sets. For example, the context value sets can be based on predefined code lists or identifier schemes. In some examples, the predefined code lists or identifier schemes may provide a fixed set of code values or identifier values that can be used as context values. For example, an identification of a specific business context can include a set of values to be assigned to the context categories in order to describe the business situation in an unambiguous and formal way.

In some embodiments, the definition and naming of the context entity, the context value set, and the context values may follow a standard naming convention, such as that used with the CCTS implementations. The sets of business context within context categories may be specified by the assigned context value sets within each context category.

In some embodiments, the common repository 102 can evaluate the business context using a business context logic in the business collaboration model 200. For example, the common repository 102 can set the business context set of the business collaboration model 204 to include the business context set of the economic contract 202. For example, the business context of the business collaboration model 204 may depend on the business context of the business parties (e.g., the stakeholders 214 and/or the business partners 216) and the business context of the contained business collaborations 220.

In certain implementations, business context information for each partner is input into the model 200. In one example, the common repository 102 receives business context information from the buyer party 106a and the seller party 106b. For example, the buyer party 106a and the seller party 106b provides business context information about the industry, the geopolitical region, the system, and the business process role in the collaborative business process model 200. Using the provided business context information, the common repository 102 can generate the business context for the economic contract 202 and the business collaboration model 204. One example of the business context values of the business collaboration model 204 is shown in the following table.

| Business Collaboration Model (Contract) | | |
|---|---|---|
| (Collaborative) Business Process = Business Collaboration Business Entity and Authorized Roles | | |
| | Initiating Party | Reacting Party |
| Business Context | Business Process Role Geopolitical Industry System | Business Process Role Geopolitical Industry System |

As shown in the above table, the business context of the business collaboration model may include context categories such as industry, geopolitical, business process role, and business process, to name a few examples. The business collaboration model also includes the pre-defined business entities and authorized roles. For example, the authorized roles can be played by the participating business partner. In some embodiments, each of the business partners may include a mapping to map the business partners to the authorized roles.

The authorized roles may share artifacts defined in the business collaboration. In some implementations, the business collaboration can be decomposed in further binary business collaborations or the business transactions. The business collaboration can be stored in the common repository that may have predefined choreography, interactions, and roles. In some embodiments, the business context set of the business collaboration is a subset of the business context set of the business collaboration model. For example, if the business collaboration model includes only one business collaboration, then the business collaboration may have the same business context as the business collaboration model.

Depending on the business context of the business collaboration, the participating artifacts can be different. In some implementations, the business context of the business collaboration model may include context categories that depend on business context of the stakeholders, the business partners, or the business collaborations. In some embodiments, the business collaboration model can include two types of business context categories. For example, a first type of the context category may be a business process context category. In some examples, the business process context category may be a general context category that depends on the business processes. For example, the other type of business context category may include context categories such as the industry, the geopolitical region, and the business process role. In some examples, the second type of business context category may depend on the stakeholders and/or the business partners.

In some embodiments, the artifacts participating in the business collaboration model may have a different business context than the same artifacts in the common repository. For example, the business collaboration model can use the artifacts from the common repository in a specific business context that is a subset of the business context of the artifacts in the common repository.

Using the REA ontology, contexts of the authorized role 212 and the business entity 224 are subsets of contexts of the business process 218. In some examples, some or all of the business contexts in the business collaboration model 204 may also be included in this set. In one example, the business collaboration model 204 can use a subset of a collaborative business process and artifacts of the collaborative business process that are relevant to the business context of the business collaboration model 204. For example, a set of artifacts in the common repository 102, such as the business processes 218, the authorized roles 212, the business entities 224, and the business collaboration models 204 may be defined as:

Business Processes={BP1 ... BPn},n∈N

Business Entities={BE1 ... BEn},n∈N

Business Roles={BR1 ... BRn},n∈N

Business Collaboration Models={M1 ... Mn},n∈N

As an example, an element Mi of the business collaboration models set (M) can be defined as a union set of the business collaborations 220.

Mi=∪BPi

The business context of the element Mi can be defined as a union set of the Business Context sets of the business processes 218, the participating authorized roles 212, and the business entities 224:

$C_{Mi} = C_{BPi} \cup C_{BRi} \cup C_{BEi}, i \leq n$

Figure 6:
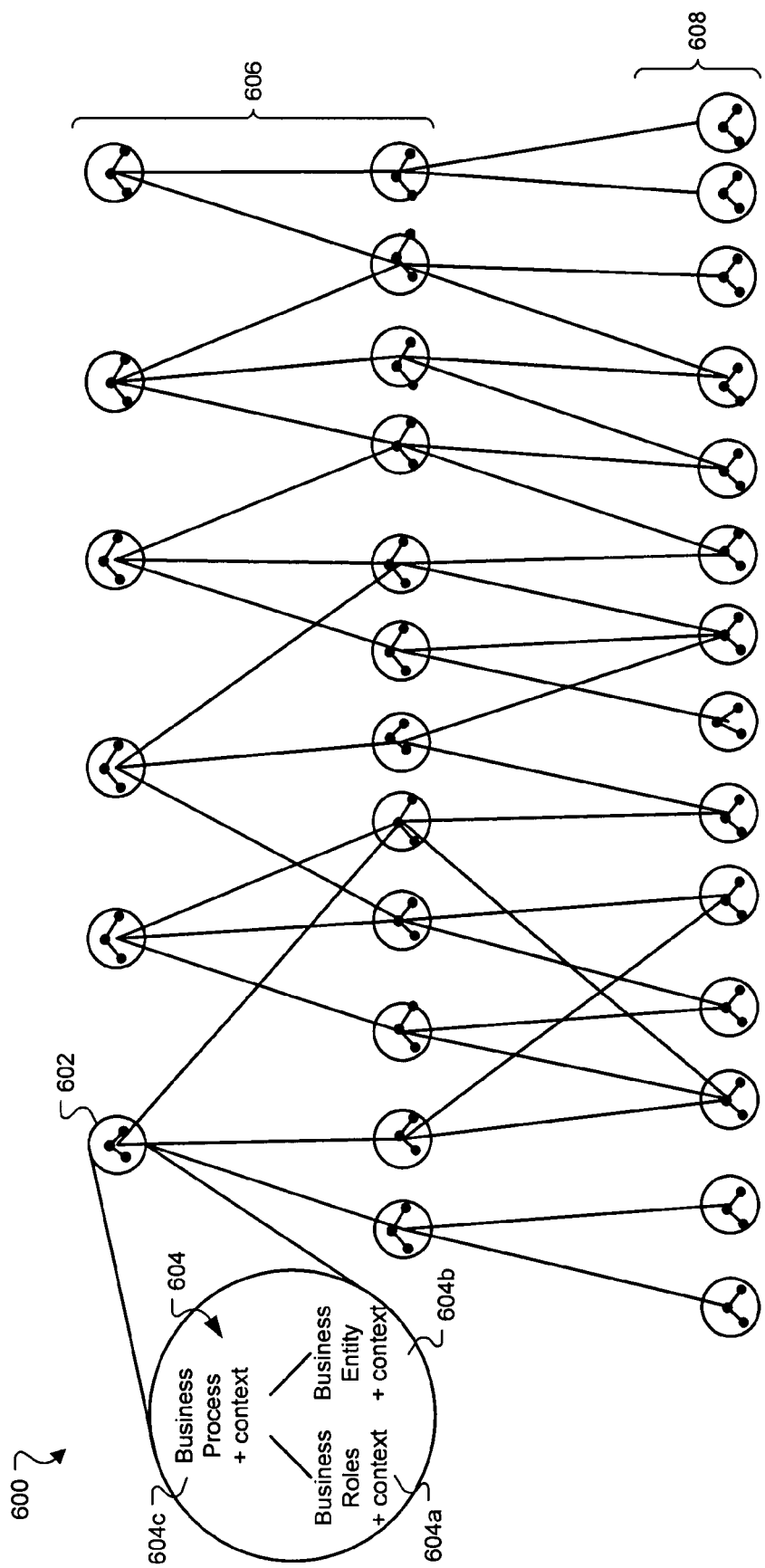
FIG. 6 schematically shows an example business collaboration free tree for storing collaborative business processes.

The element Mi can be used also in a business context that is a subset of the whole business context set of the element Mi. The subset can be realized as the business collaboration model 204 between the business partners 216. The business context set for the business collaboration model 204 can be defined as follows:

$$C_{Mi'} = \cup C_{BPi'}, i \leq n$$

$$C_{BPi'} = C_{BRi'} \cup CBEi', i \leq n$$

where $C_{BPi'} \subset C_{BPi}, C_{BRi'} \subset C_{BRi}, C_{BEi'} \subset CBEi$, and $C_{Mi'} \subset C_{Mi}$ In some embodiments, the context driven business processes can be stored in a free tree data structure. For example, the common repository 102 may store the context driven business processes as one or more free trees. FIG. 6 shows an example business collaboration free tree 600 for storing collaborative business processes. For example, the common repository 102 may store the free tree 600.

The free tree 600 may be a tree without a designated root node. As shown in FIG. 6, the free tree 600 includes a number of nodes 602. In some examples, each node of the free tree 600 may represent a portion of a business process. For this purpose, the node includes one or more artifacts, such as process components, business entities and business roles. For example, each of the nodes 602 may include artifacts 604 with corresponding business context values of the business collaboration. In this example, the artifacts 604 include business roles 604*a* and a business entity 604*b* of business collaboration models according to the REA Ontology of a collaborative business process 604*c*.

The free tree 600 includes upper nodes 606 and leaf nodes 608. For example, the upper nodes 606 may be business collaborations that can be decomposed into one or more business collaborations (e.g., represented as child nodes of the upper nodes). The leaf nodes 608 may be business collaborations that cannot be decomposed. In one example, the leaf nodes 608 may correspond to business transactions included in the business collaborations. In some examples, the common repository 102 may facilitate reuse of the collaborative business process by storing the collaborative business processes in the free tree 600.

Figure 7:
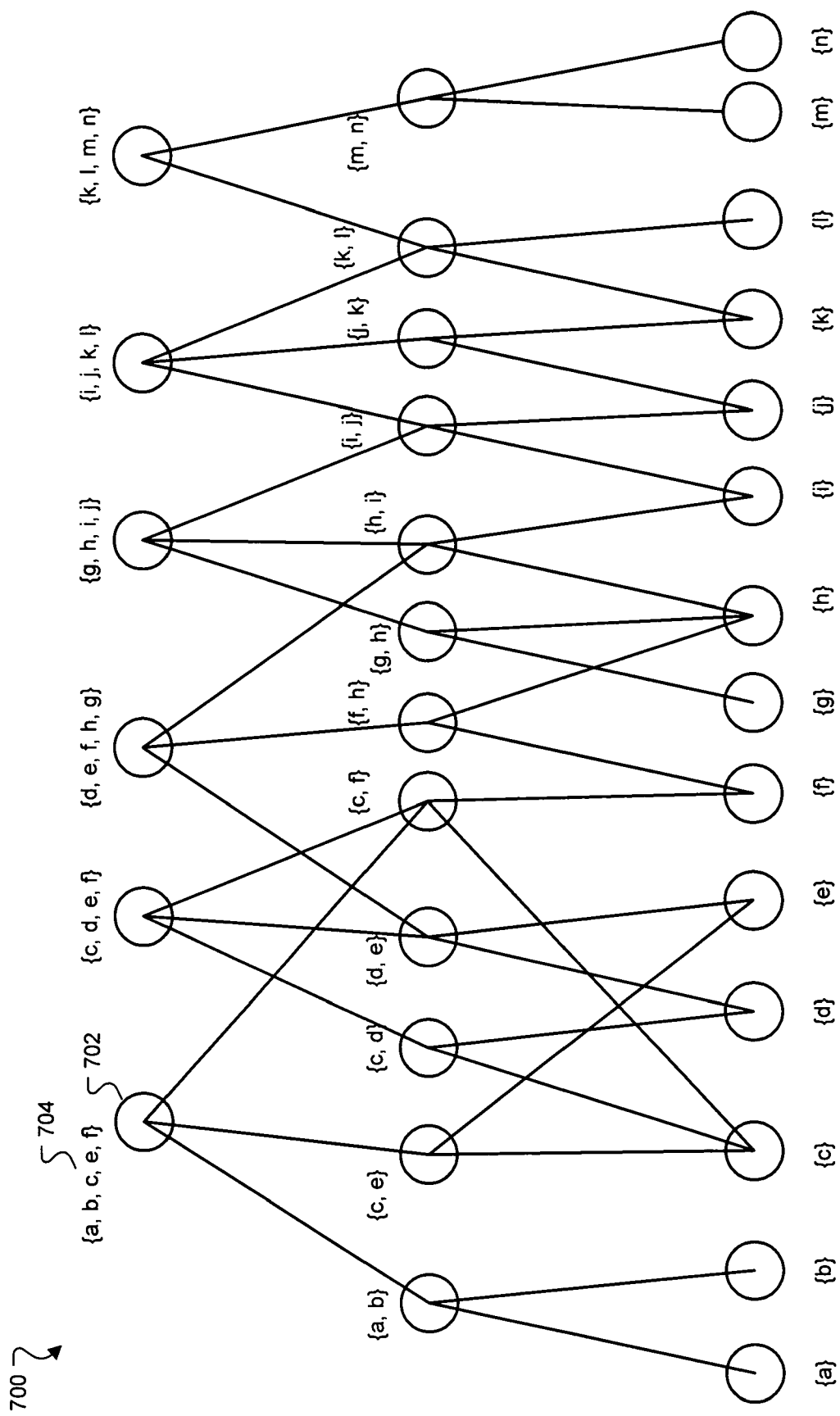
FIG. 7 schematically shows an example context category free tree for storing business context of collaborative business processes.

FIG. 7 shows an example context category free tree 700 for storing business context of collaborative business processes. For example, the common repository 102 may store the business context in the context category free tree 700. The context category free tree 700 includes nodes 702. For example, each of the nodes 702 may correspond to one of the nodes 602 in the business collaboration free tree 600. In some embodiments, each of the nodes 702 includes context values 704 of collaborative business processes represented by the corresponding nodes 602. The context values of the leaf nodes in the tree 700 (e.g., {a} or {b}) are subsets of the context values for the corresponding upper level nodes (e.g., {a, b} or {a, b, c, e, f}).

Figure 8:
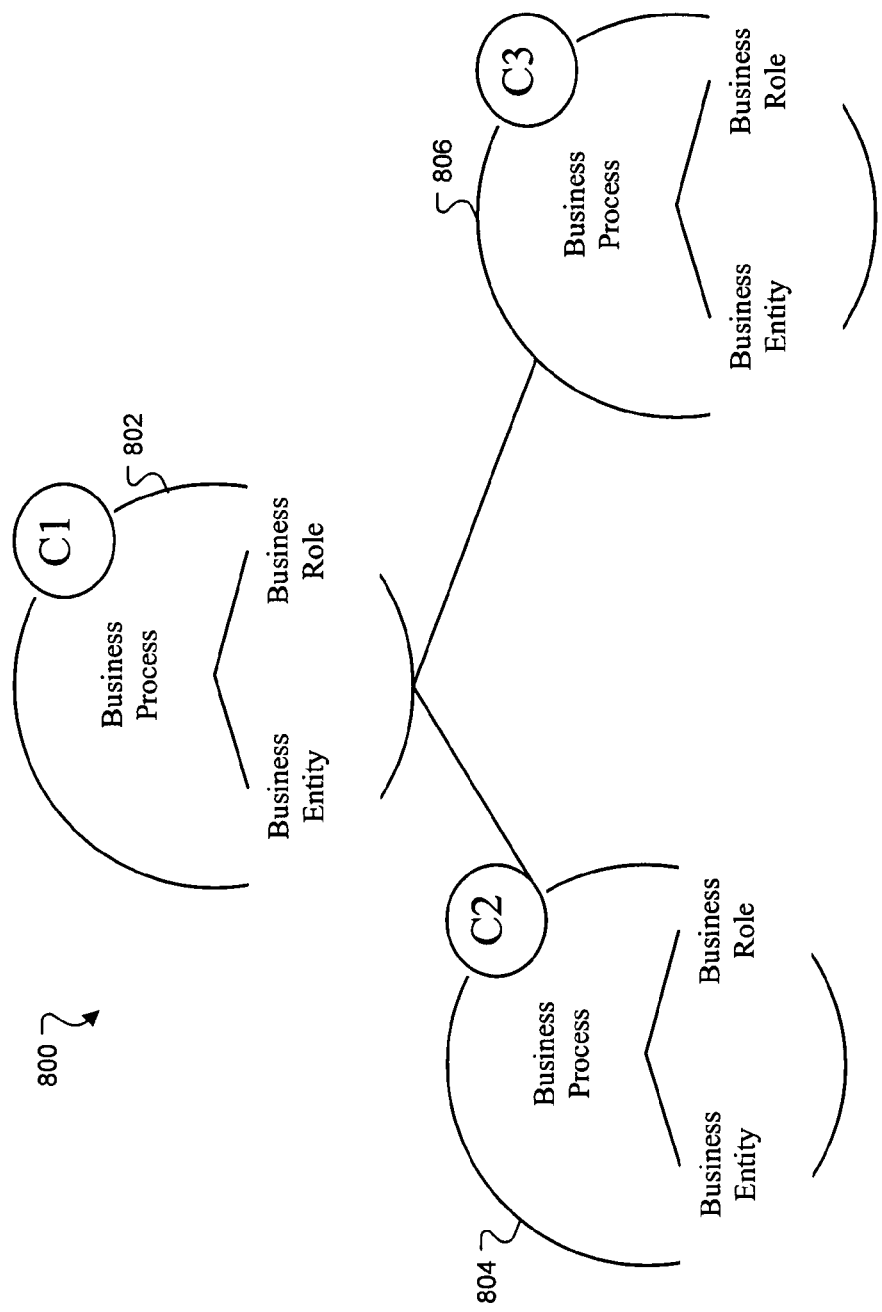
FIG. 8 schematically shows an example context-specific root tree.

FIG. 8 shows an example context-specific root tree 800. In some embodiments, the common repository 102 may derive the context-specific root tree 800 from the free trees 600, 700. For example, the system 100 can derive the root tree 800 using a defined business context based on a received query having a specific business context. In one example, the root tree 800 may be an indicator for a query in a specific business context.

The root tree 800 includes a root element 802. For example, the root element 802 may be representing the result of a business context query. In some embodiments, the root element 802 can include the business context set that is used in the business collaboration model. The root tree 800 includes lower nodes 804, 806. In some examples, the lower nodes 804, 806 may have business context sets that are subsets of the business context set of the root element 802.

In some embodiments, the root element 802 may include some or all context values for the business collaboration model. In some embodiments, the context values of the upper elements (e.g., the root element 802 or other non-leaf nodes) may include more context values then the lower nodes 804, 806. In some examples, the child nodes may include context values that are subsets of the context values of the root element 802. For example, the leaf nodes 804, 806 may include the most specific context values of a business collaboration model.

As an illustrative example, the common repository 102 can select a modeling artifact upon receiving a query with a specific context. For example, the repository 102 can select one of the nodes 602 in the free tree 600 as a root node according to the specific context. For example, the repository 102 can compare the specific context to the context of the nodes 602 using the free tree 700. In one example, the repository can select the node 602 having the most relevant context values to the specific context. Based on the selected root node, the repository 102 can derive the context-specific root tree 800. For example, the derived root tree 800 may include tree nodes having respective context values. In one example, the respective context values may be subsets of the context value of the selected root node. In some embodiments, the common repository 102 can select the modeling artifacts, to be provided for modeling or implementing a collaborative business process, using the root tree 800.

In some implementations, the common repository 102 can use a UN/CEFACT Modeling Methodology (UMM) approach to build a UMM compliant business collaboration model. A step-by-step approach can be used to build the UMM compliant business collaboration model. Some examples of a methodological process for building the UMM compliant business collaboration model are described below.

Figure 3:
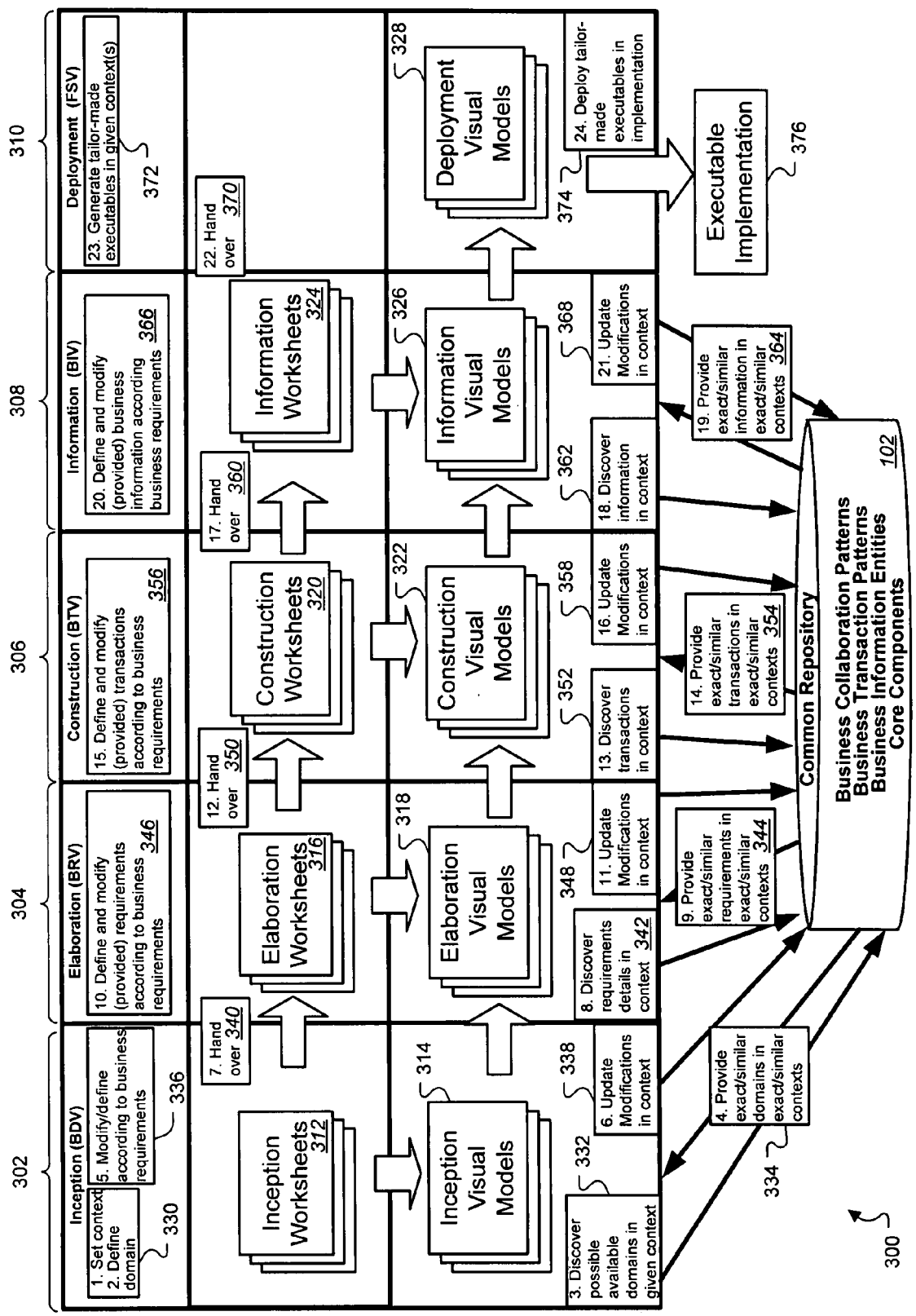
FIG. 3 shows an example process of a modeling method for a collaborative business process.

FIG. 3 shows an example of a modeling method 300 for a collaborative business process. For example, the system 100 can use the modeling method 300 to generate and modify a collaborative business model. The method 300 here includes five encapsulated phases: an inception phase 302, an elaboration phase 304, a construction phase 306, an information phase 308, and a deployment phase 310. In this example, each of the phases 302, 304, 306, 308, 310 is used to create a view for the collaborative business model. In other implementations, more or fewer phases can be used. In one example, a collaborative business process can include the inception phase 302, the elaboration phase 304 and the construction phase 306, optionally together with either, both or none of the information phase 308 and the deployment phase 310.

The method 300 here uses interacts with the common repository 102. Using the common repository 102, the method 300 may retrieve and update modeling artifacts. As shown, the common repository 102 in this example includes modeling artifacts including business collaboration patterns, business transaction patterns, business information entities, and core components to users of the method 300. In some embodiments, the users retrieve one or more modeling artifacts from the common repository 102 according to user specific business contexts. In some embodiments, the users can also modify the retrieved modeling artifacts according to user specific business requirements and update the common repository 102 using the modified modeling artifacts.

The inception phase 302 as implemented can involve a business domain view (BDV). For example, business domain experts can use the inception phase 302 to create the business domain view for the collaborative business model in a given business context. In one example, the business domain experts analyze the common repository 102 for corresponding business partners, products, or services. In some examples, the business domain experts can also create a new business in the common repository 102. In some examples, the business experts can explore and analyze offered products and services for individual enterprises.

In some embodiments, the business domain experts can submit a request for the individual enterprises of business profiles. Upon receiving the request, the repository 102 provides a pre-defined user specific business collaboration model in form of formalized worksheet 312 as an initial building block of the BDV. For example, the business domain experts can modify the predefined business collaboration model. In the depicted example, the business domain experts can modify to generate one or more inception visual models 314 in a given business context. In some examples, the business domain experts can transmit a request to update the repository 102 using the inception visual models 314.

The elaboration phase 304 may be implemented using a business requirement view (BRV). In one example, the BRV may be used to capture detailed user requirements. For example, the user requirements may be specified by the stakeholders, for the business-to-business project. In some embodiments, business requirement experts can create the details of the collaborative business model by using information from the BDV. In the elaboration phase 304, the collaborative business model may be modified for interrelationships between the business partners to describe their activities and the order of these activities.

The elaboration phase 304 includes one or more elaboration worksheets 316 and one or more elaboration visual models 318. For example, the business requirement experts can use the worksheets 316 to generate the elaboration visual models 318. In some embodiments, the business requirement experts may re-use models or fragments of models that are already developed in other business. For example, the business requirement experts can include business context-specific adjustments to the modified model 318. In one embodiment, the repository 102 can semi-automatically harmonize these adjustments with already registered artifacts in other business contexts.

The construction phase 308 is implemented using a business transaction view (BTV). In one example, after defining the business requirements in the business collaboration model, the business process designers can continue modeling the collaboration business model using construction worksheets 320 to create construction visual models 322 to be stored in the repository 102 in the BTV.

The information phase 306 is related to a business information view (BIV). In one example, after defining the business transaction in the business collaboration model, business data designers can continue modeling the collaboration business model using one or more information worksheets 324 by adding business information according to the business requirements. As shown, the business data designer may create one or more information visual models 326 to be stored in the repository 102 in the BIV.

The deployment phase 310 is implemented using a business functional service view (FSV). In one example, after defining the business information in the business collaboration model, functional service experts can generate executables based on the collaboration business model. As shown, the functional service experts can generate one or more deployment visual models 328 in the FSV.

In some embodiments, the business experts in the phases 302, 304, 306, 308 can use the worksheets 312, 316, 320, 324 to capture relevant information from the views. In one example, the worksheets 312, 316, 320, 324 may be pre-defined worksheets according to the UMM meta model. In one example, the business experts can use the worksheets 312 to describe a specific business domain in a descriptive and non-technical way. For example, the worksheets 312 can be used independent of a specific modeling tool. In one embodiment, the business experts can assemble the information during the analysis of an electronic commerce business process using the UMM meta model. For example, the worksheets 312, 316, 320, 324 may be the information base used to create one or more base models in the collaborative business model. In one example, the business experts and modelers can transform the information in the worksheets 312, 316, 320, 324 into UMM compliant models (e.g., based on the UML Notation).

In some embodiments, the models 314, 318, 322, 326, 328 can be UMM compliant models. For example, the worksheets 312, 316, 320, 324 may be used to describe the models 314, 318, 322, 326 according to the UN/CEFACT UMM. The UMM worksheets may be used to capture the information needed to produce the UMM Models for each view. In some examples, the UMM worksheets may be represented as tagged values that describe the modeling artifacts defined in the UMM meta models. In one example, the UMM worksheets can be used to describe UMM artifacts. For example, the tagged values of the UMM worksheets may be an artifact property to indicate a specific context of the artifact. In some examples, a single artifact may be related to more than one property values based on context variations of the artifact.

In some embodiments, the system 100 can generate the context-specific worksheets 312, 316, 320, 324 through tool support. For example, the worksheets 312, 316, 320, 324 may include relevant business context information concerning the considered artifact in a specific business context. The method 300 can be organized in the described views so that each business process and information model can be viewed from a number of perspectives. In some embodiments, the worksheets 312, 316, 320, 324 and models 314, 318, 322, 326, 328 may include unambiguous definitions of the semantic and logic of a collaborative business process at the specific phase of modeling.

As shown in FIG. 3, the method 300 is a top down approach with the specific business analysts and business modeling experts using the same content and models. Depending on the view, the experts may receive the worksheets 312, 316, 320, 324 included with the view with specific semantic details. Additionally, the experts may also receive the models 314, 318, 322, 326, 328 that consider the logic behavior of the collaborative business model. The method 300 uses the common repository 102 to provide artifacts, such as business collaboration models, business processes, business transactions, and business information entities. In some examples, the common repository 102 may then establish a framework for a collaborative business modeling method for sharing of context-specific business artifacts of a collaborative business process in a business community.

In a specific implementation, the method 300 can begin with setting context and defining a domain in step 330. In one example, the method 300 begins when a new business partner registers in the common repository 102. The business partner may provide a basic profile to the repository 102 for registration. For example, the basic profile may include user specific information, such as respective business partners and user ID. Additionally, the business domain experts set especially his own context values such as his industry, or geopolitical context values. One example of the basic profile may be the identification 138 or 146 (FIG. 1). The inception phase 302 defines a domain of a required collaborative business. For example, the business domain expert may write an economic contract for a new collaborative business and defines the range and boundaries of collaborative business issue. Based on the identified domain, the business domain expert may determine the relevant stakeholders and determine the scope and associations of the collaborative business.

Next, the method 300 includes discovering possible available domains in a given context in step 332. For example, the business domain expert can request the common repository 102 for available business collaboration models based on the business domain. For example, the experts can request a purchasing model or and invoicing model that fits to the domain requirements in the given business context.

The method 300 then includes providing exact or similar domains in exact or similar contexts in step 334. For example, the repository 102 may provide an overview of a business collaboration model or overviews of a list of collaboration business models after receiving the request. For example, the overviews may be recommendations based on the defined requirements of the established economic contract in the given context. In one example, if the business domain expert transmits a query with an identification having unambiguous predefined context information, then the repository 102 can provide a similar context-specific result. For example, if the proposed context-specific business collaboration model corresponds to the business requirements, then the context category sets in the repository 102 is updated with the new context-specific information of the latter requested query. For example, the contract can be an intersection set of the business contexts of the user profiles and optionally the predefined collaborative business processes.

The method 300 includes modifying or defining business collaboration models according to own business requirement in step 336. After receiving the business collaboration models, the user can select a model from the offered models list and modify the business context of the selected model. For example, the user can modify the context value in the categories such as industry, geopolitical region, business process, business role to adjust the model to the user's business environment.

After the modification of the repository delivered business collaboration models, the repository 102 can provide a more detailed business collaboration model description. For example, the business domain expert can use the description to analyze the recommended business collaboration model to determine whether the business collaboration model match the business requirements of the contract. In some examples, the business domain expert may modify the recommended business collaboration model based on the predefined business requirements. For example, the business domain expert can change the provided stakeholders or may modify the boundaries of the business scope.

The method 300 includes updating modifications in context in step 338. For example, the business context-specific modifications of the collaborative business model can be submitted into the repository 102. Then, the repository 102 can store the modifications based on, for example, whether the business context-specific modification are already registered by another business context, whether the business context-specific modifications are similar to a registration of another business context, and/or whether the business context-specific modifications are completely new and not registered in the repository 102. Using a governance and harmonization process, the repository 102 can check the submitted modifications in detail, and may change, and/or clarify modifications with the business domain expert. In some embodiments, the governance and harmonization process may result in either accepting the modifications or merging the modifications with other registered artifacts.

After updating the repository 102, the business domain expert may hand over in step 340 the modeled business domain and overview of the business collaboration model to the elaboration phase 304. For example, the elaboration phase 304 may be performed by a business requirement expert (e.g., a business owner). For example, the business requirement expert may have detailed knowledge of the business process activities. For example, the business requirement expert can perform an elaboration of the business requirements by detailing the overview of business collaboration model with collaborative activities between business partners.

In the elaboration phase 304, the method 300 includes discovering requirements details in context in step 342. In some embodiments, the business requirement experts may use the common repository 102 to discover a more detailed model that may consider the business requirements within the specific business context. For example, the business requirement expert may obtain necessary information for discovering in the hand over step 340.

After discovering requirements details, the method 300 include providing exact or similar requirements in exact or similar context in step 344 from the common repository 102. In some embodiments, the common repository 102 may provide at least one business collaboration model (BCM) with the aspects of the business requirement within the given business context. For example, the business requirement expert may use the proposal to discover and reconcile suitable artifacts according the business requirements.

In some embodiments, the common repository 102 may provide one or more BCMs that are similar to the specific declarations and similar contexts based on the business requirement query. For example, the context similarity may be determined mathematically as congruence of the predefined sets (context categories) of elements (context categories values). If the proposed context-specific business collaboration model responds to the business requirements, then the common repository 102 may update the context category and set the new context-specific information of the requested query.

Next, the method 300 includes defining and modifying requirements according to business requirements in step 346. For example, the business requirement expert can select among the provided BCMs to fit the business requirements. If the provided BCMs do not fit the business requirements, the business requirement expert can modify some artifacts in the BMC according to the contract. In some examples, the modification step 346 may be an interactive process that narrows the business needs.

After modifying the BCMs according to the business requirements, the method 300 includes updating modifications in context in step 348. For example, the business context-specific modifications can be submitted to the common repository 102. The common repository 102 can store the modifications based on, for example, whether the business context-specific modification are already registered by another business context, whether the business context-specific modifications are similar to a registration of another business context, and/or whether the business context-specific modifications are completely new and not registered in the repository 102. Using a governance and harmonization process, the repository 102 can check the submitted modification in detail, and may change, and/or clarify modifications with the business requirement expert. In some embodiments, the governance and harmonization process may result in either accepting the modifications or merging the modifications.

Next, the method 300 includes a hand over in step 350, in which the business requirement expert can communicate the detailed business collaboration model to the business process designer. For example, the business process designer may have knowledge of the business transactions. In some examples, the business process designer may construct the business transactions by detailing an overview of the business activities with detailed transaction information required for exchanging between the business partners.

After getting the detailed requirements of business collaboration model in the given business context, the method 300 includes discovering business transactions within the specific business context in step 352. For example, the business process designer may use information from the elaboration phase 304 for discovering.

Similar to the elaboration phase 304, the construction phase 306 here includes providing exact or similar transactions in exact or similar context in step 354 from the common repository 102. For example, after sending the additional modifications of the context, the common repository 102 may generate a new proposal of the BCM.

The method 300 includes defining and modifying transactions according to business requirements in step 356. For example, the business process designer can analyze the business context-specific BCM. If the desired artifact in the business context does not exist, the business process designer may, for example, query for an alternative artifact with the same semantic but in a different business context from the common repository 102.

After modifying the BCMs according to the business requirements, the method 300 includes updating modifications in context in step 358. For example, the common repository 102 receives the business context-specific modifications. The common repository 102 can store the modifications based on, for example, whether the business context-specific modification are already registered by another business context, whether the business context-specific modifications are similar to a registration of another business context, and/or whether the business context-specific modifications are completely new and not registered in the repository 102. Using a governance and harmonization process, the repository 102 can check the submitted modification in detail, and may change, and/or clarify modifications with the business requirement expert. In some embodiments, the governance and harmonization process may result in either accepting the modifications or merging the modifications.

Next, the method 300 includes a hand over in step 360, in which the business process designer can communicate the detailed business collaboration model to the business data designer in the information phase 308. For example, the business data designer may have detailed knowledge of the business information. The business data designer may construct the business information by detailing an overview of the business transactions with detailed business information that is required for exchanging between the business partners.

In the information phase 308, the method 300 includes discovering information in context in step 362. In some embodiments, the information phase 308 may be a shared registry or a shared repository environment. For example, the business data designer can query and download the appropriate specialization of business data models that are relevant to the specific business transactions within the specific business context.

Next, the method 300 includes providing exact or similar information in exact or similar context in step 364. In one example, the business information may be classified by the values assigned to their context categories. For example, the common repository 102 can use the specific context value to determine whether a business information entity is relevant in the business context. Therefore, the common repository 102 can provide a specialization of the business information models according to the given business context. In some embodiments, the common repository 102 may also provide business information models that are classified by other business contexts or similar business information models that are classified with the same business context.

After providing the business information models, the method 300 includes defining and modifying business information according to business requirements in step 366. In one example, the business data expert can use the provided business information model as is. In another example, the business data expert can modify the business information model as required by their additional context requirements. Based on the modifications, the repository 102 may provide further artifacts that may fit to these modification aspects.

The method 300 includes updating modifications in context in step 368. For example, the context-specific modifications can be uploaded to the common repository 102 so that the modifications may be publicly available for business partners. In some examples, other users having same or similar business requirements may also use the modifications. For example, if another user needs exactly the same model extension, the user can use the already defined business information. Additionally, the business context can be added into the appropriate context categories so that other business information experts can retrieve the extension and use the extension in other contexts.

Next, the method 300 includes a hand over in step 370. For example, the business information expert may obtain approval from other involved experts of the collaborative business model. After approval, the completed and tailor-made business collaboration model may be handed over to a software integrator. In the deployment phase 310, the software integrator generates a tailor made executables in the given context in step 372. Next, the method 300 includes deploying the tailor-made executables implementation in step 374. For example, the software integrator may use the provided models to generate a Business Collaboration Specification Scheme (BCSS) based and Meta Object Facility (MOF) compliant XML Metadata Interchange (XMI) format in order to generate executable interfaces for the business partners. In some embodiments, the interfaces for business process can be based on Business Process Execution Language (BPEL) and WSDL (Web Service Definition Language). In some embodiments, the interfaces for the business information may be based on UN/CEFACT XMLNDR for CCTS. As shown in FIG. 3, the method 300 generates an executable implementation 376 after the deployment phase 310.

Figure 4:
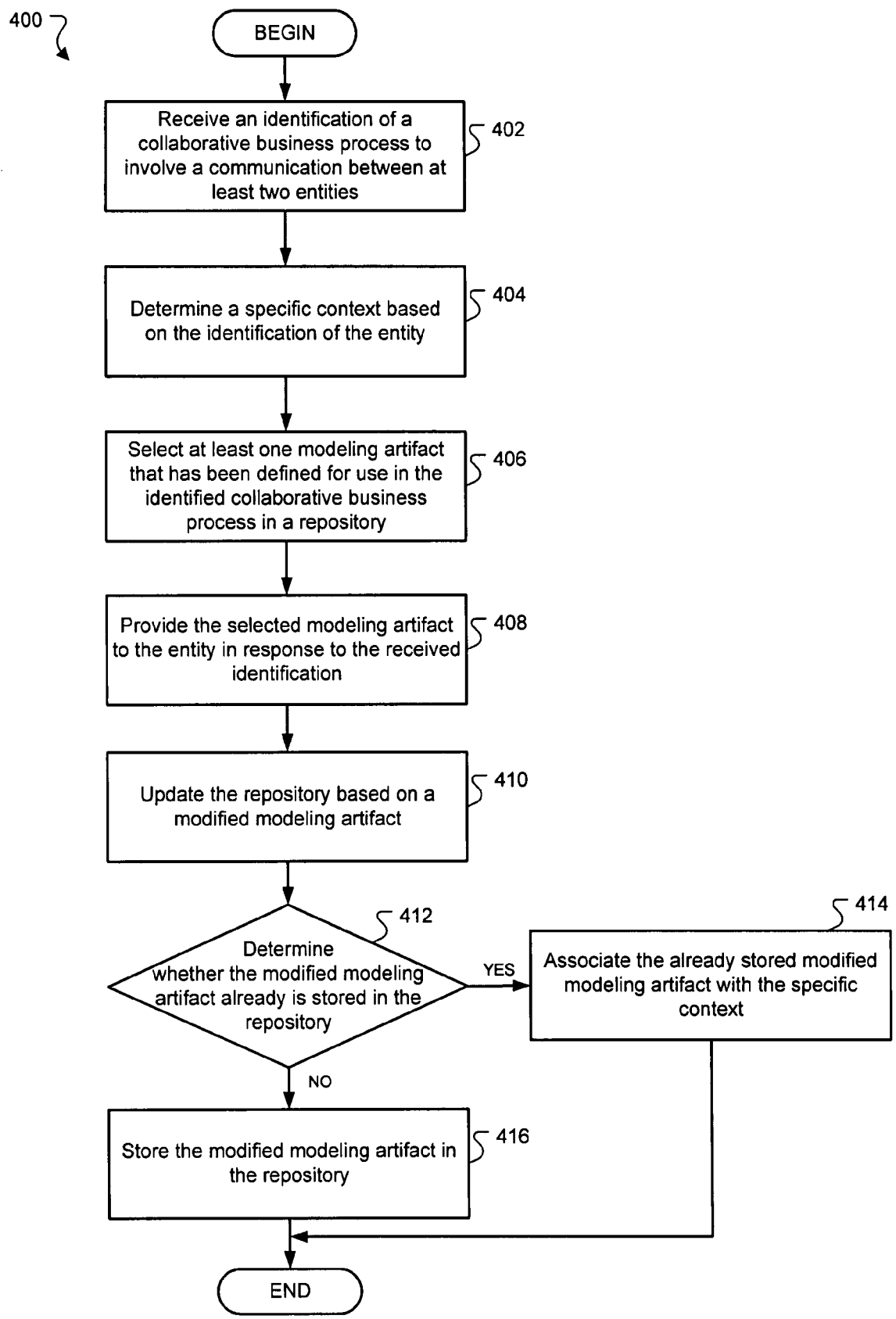
FIG. 4 is a flow diagram illustrating an example method for context specific modeling of a collaborative business process.

FIG. 4 is a flow chart of exemplary operations 400 that can be performed for context-specific modeling of a collaborative business process. The operations 400 can be performed by a processor executing instructions stored in a computer program product. The operations 400 begin in step 402 with receiving an identification of a collaborative business process to involve a communication between at least two entities. For example, the common repository 102 may receive the identification 138 of a collaborative business process to involve a purchasing or a purchase order request between the buyer 134 and the seller 136.

In step 404, the operations 400 comprise determining a specific context based on the identification of the entity. For example, the common repository 102 may determine the specific context of the seller 136 based on the identification 138 or by any other approach, such as by detecting a characteristic of the seller's system.

The operations 400 comprise selecting at least one modeling artifact that has been defined for use in the identified collaborative business process in a repository in step 406. For example, the common repository 102 may select one or more of the modeling artifacts of the business process 110 based on the determined context of the users 134 or 136.

Next, the operations 400 comprise, in step 408, providing the selected modeling artifact to the entity in response to the received identification. For example, the common repository 102 can provide the context-specific subset 140 to the buyer 134 based on the context values of the buyer 134.

In step 410, the operations 400 comprise updating the repository based on a modified modeling artifact. For example, the common repository 102 may receive a modification (e.g., the context specific extension 144) from users. Using the received modification, the common repository 102 can update the stored data.

The operations 400 comprise determining whether the modified modeling artifact already is stored in the repository in step 412. For example, the common repository 102 can search the stored artifacts and determine whether a received modification is identical to an already stored artifact associated with another context.

If the modified modeling artifact already is stored in the repository, the operations 400 comprise, in step 414, associating the already stored modified modeling artifact with the specific context. For example, upon determining that an artifact sought by a cosmetics industry participant is already used in the automotive manufacturing industry, the common repository 102 may associate the already stored modified artifact with the context values of the users.

In contrast, if the modified modeling artifact is not already stored in the repository (neither for the present context nor for any other context), the operations 400 comprise storing the modified artifact in the repository in step 416, associated with the proper context value(s). For example, the common repository 102 may store the modified artifact.

FIG. 5 schematically shows an overview relating to context-driven modeling of a collaborative business process. The overview conceptually depicts one or more responsibilities 502, here exemplified by roles: a business expert role, a business modeler role and a technical expert role. The roles characterize different responsibilities that can impact the modeling of the collaborative business process.

Each role can access one or more of architecture views 504, for example any or all of the views described with reference to FIG. 3. Here, the business expert role has access to at least a business domain view and a business requirements view. The business modeler role has access to at least a business transaction view and a business information view. The technical expert role has access to at least a business service view.

Each of the architecture views 504 can provide for performance of one or more activities 506. Here, the business domain view can provide that the business expert can do at least any or all of the following: query the repository, for example the repository 102 (FIG. 1); start creating a contract; enter business process requirements; set and apply a business context, for example the identification 138; and/or analyze the business domain view.

The business requirements view can provide for the business expert to do at least any or all of the following: modify and narrow the context by defining a business process activity model, for example to create the context-specific extension 144; engage in discovery of business collaboration and transaction requirements, for example to identify any or all aspects to be covered by the collaborative business model; set and apply a business context; and/or analyze the business requirements view.

The business transaction view can provide for the business modeler to do at least any or all of the following: modify and narrow the realization of the context values of the business requirements into business choreography and business interaction; engage in discovery of a business collaboration protocol and one or more business transactions that apply to the collaborative business process; and/or to analyze the business transaction view.

The business information view can provide that the business modeler can perform at least data modeling, for example using a CCTS modeler tool.

The business service view can provide for the technical expert to at least generate serialization to an execution language of the process, such as BPEL.

One or more other roles, architecture views and/or activities can be used.

In some embodiments, the name of the artifacts used in the system 100 may be based on ISO 11179 and can be derived from a definition written in a natural language. In some embodiments, the identifications 138, 146 may includes a natural language phrase. For example, the identification 138 may include a natural language phrase containing information to describe some or all business context of the buyer 134. In one example, the identification 146 may include a phrase "cosmetic supplier in France" to describe the industry, the country, and the business role of the seller 136. In other examples, the natural language phrase may be a complete sentence.

In some embodiments, the common repository 102 may analyze the natural language phrase to identify the collaborative business process. In one example, the common repository 102 may analyze the phrase "cosmetic supplier in France" to determine the context values for each of the context category, the industry, the country, and the business role. Using determined context values, the common repository 102 can identify a collaborative business process relevant to the seller 136.

In some embodiments, the common repository 102 may store the modeling artifacts by associated at least one name according to a naming convention. For example, the at least one name may be used in analyzing the natural language phrase used in the identifications 138, 146. In one example, the common repository 102 may associate artifacts relevant to the buyer 134 with a name having semantic meaning of the context values in the identification 138 by complying to the naming convention.

In one example, the common repository 102 may use part 4/5 of the ISO 11179 naming convention. In one embodiment, the common repository 102 may use the ISO 11179-5 to associate at least one Dictionary Entry Names (DEN) to each of the entities in a collaborative business process. For example, the common repository 102 may include a naming module that includes rules to enable meaning to be conveyed, relate items in a consistent, specified order, reduce redundancy and increase precision of terms, and prevent synonyms and homonyms occurring within the scope of the naming convention. Examples of automatically deriving a name from a definition are described in co-pending patent application Ser. No. 11/400,837, filed Apr. 7, 2006 and entitled "Generating a Unique Name for a Data Element", the contents of which are incorporated herein by reference.

In some embodiments, the business requirements of each business process artifact may be described by sentences in a natural language. For example, each artifact may be described by at least one grammatically correct and precise sentence in English. The Dictionary Entry Names of the artifacts may be derived from these definition sentences. In one example, the common repository 102 may extract relevant words in describing the semantic meaning of the artifact in the definition sentence.

In some embodiments, the definition sentence may include three primary parts. The three primary parts may be an subject, a predicate, and an object. For example, the subject is built by one or more noun, pronoun, noun phrases, or pronoun phrases. Additionally, the subject represents a representation term of business process artifact. For example, the predicate may include the verb, verbs, or verb phrase that link up with the subject. For example, the object may be defined after the predicate in order to complete the verb's meaning. In one example, the DEN may reflect the three parts of a full sentence with the formal syntax: <Subject>. <Predicate>. <Object>.

Figure 9:
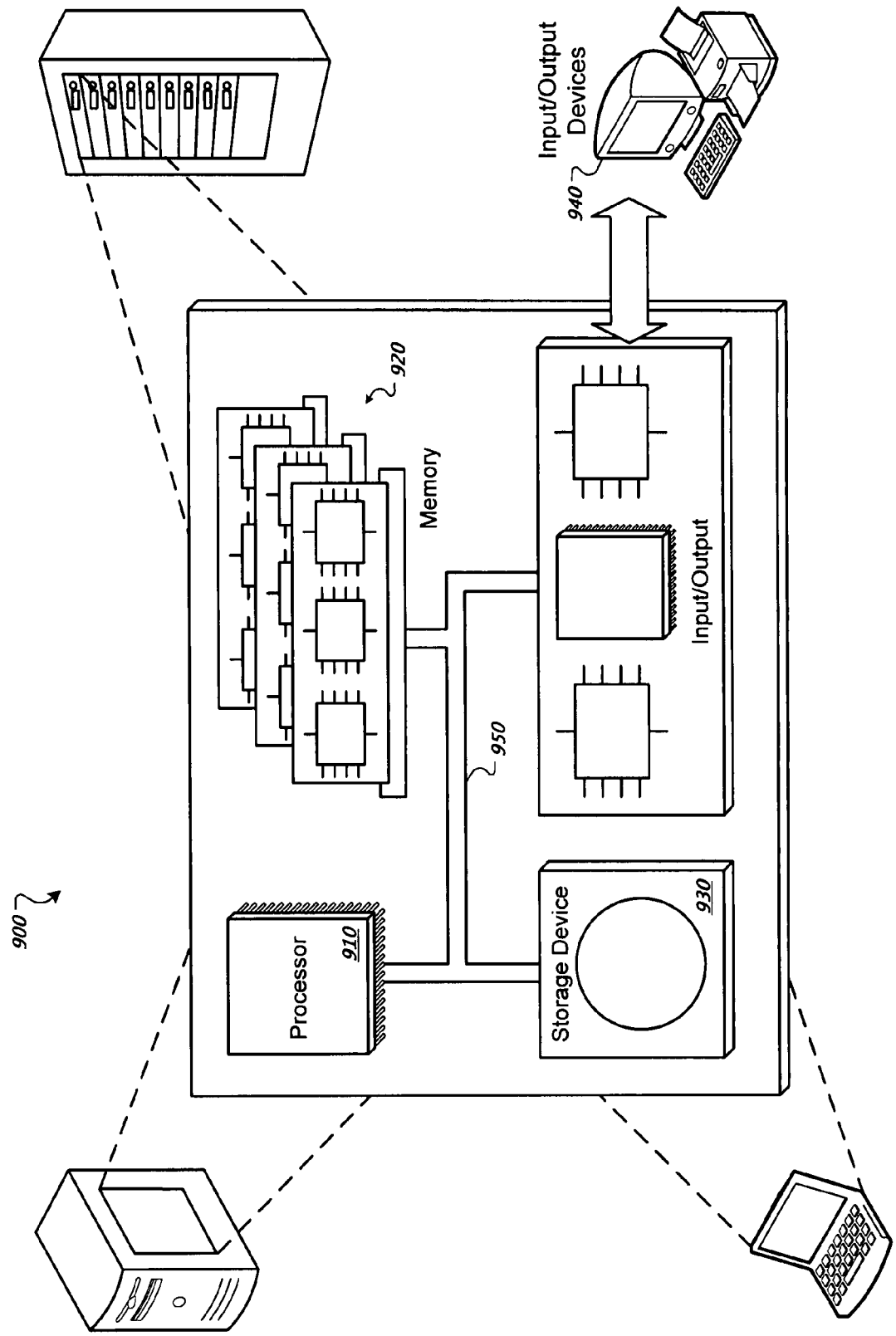
FIG. 9 is a block diagram of a computing system that can be used in connection with computer-implemented methods described in this document.

FIG. 9 is a schematic diagram of a generic computer system 900. The system 900 can be used for the operations described in association with any of the computer-implement methods described previously, according to one implementation. The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940. The system may be implemented, for example, on an individual computer 900 or on a parallel cluster of computer systems 900 distributed over a network.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 100. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for context-specific modeling of a collaborative business process, the method comprising:
   storing, by a computer system and in a repository that is accessible to other computer systems, multiple modeling artifacts, wherein each of the multiple modeling artifacts is a data component that describes a portion of a collaborative business process;
   assigning, by the computer system, each of the multiple modeling artifacts to at least one of a plurality of collaborative business processes that are represented by various combinations of the multiple modeling artifacts;
   assigning, by the computer system, each of the multiple modeling artifacts to at least one context value from a collection of context values;
   receiving, at the computer system and from a first computer system, a query that is for specialized modeling artifacts and that specifies:
      (i) a first collaborative business process that is from among the plurality of collaborative business processes, and
      (ii) a first context value that is from the collection of context values and that specifies an industry or a geopolitical region of a party that has accessed the first computer system;
   selecting, by the computer system and from the repository, a subset of the multiple modeling artifacts that the computer system had assigned to both:
      (iii) the first collaborative business process, and
      (iv) the first context value;
   providing, by the computer system and to the first computer system in response to receiving the query from the first computer system, the selected subset of modeling artifacts,
   wherein the first computer system receives the selected subset of modeling artifacts, and
   wherein the first computer system modifies a modified modeling artifact that is one of the subset of modeling artifacts;
   receiving, at the computer system and from the first computer system after the selected subset of modeling artifacts has been provided to the first computer system, the modified modeling artifact;
   determining, by the computer system, that the modified modeling artifact matches another modeling artifact that is stored in the repository and that the computer system has assigned to the first collaborative business process and another context value, the computer system not having assigned the another modeling artifact to the first context value; and
   assigning, by the computer system in response to determining that the modified modeling artifact matches the another modeling artifact, the another modeling artifact to the first context value.

2. The computer-implemented method of claim 1, further comprising:
   receiving, at the computer system and from a second computer system after the assigning, a second query that is for specialized modeling artifacts and that specifies:
      (i) the first collaborative business process, and
      (ii) the first context value;
   selecting, by the computer system and from the repository, a second subset of the multiple modeling artifacts that the computer system has assigned to both:
      (iii) the first collaborative business process, and
      (iv) the first context value; and
   providing, by the computer system and to the second computer system in response to receiving the second query, the second subset of modeling artifacts, wherein the second subset of modeling artifacts includes the another modeling artifact.

3. The computer-implemented method of claim 1, wherein the first collaborative business process is configured to involve multiple communications between at least two entities, and wherein each of the subset of modeling artifacts is configured to be included in at least one of the multiple communications.

4. The computer-implemented method of claim 1, further comprising:
   receiving, by the first computer system, the selected subset of modeling artifacts; and
   modifying, by the first computing system, the modified modeling artifact that is one of the subset of modeling artifacts.

5. The computer-implemented method of claim 1, wherein each of the multiple modeling artifacts conforms to a standardized protocol for defining semantics of contents in electronic communications.

6. The computer-implemented method of claim 1, wherein the multiple modeling artifacts are stored in the repository as a free tree that has a plurality of nodes associated with at least one context value each, wherein the free tree has no root node.

7. The computer-implemented method of claim 6, wherein selecting the subset of the multiple modeling artifacts includes:
   selecting, as a root node, one of the plurality of nodes whose at least one context value matches the first context value; and
   deriving a context-specific root tree from the free tree based on the selected root node, wherein nodes of the context-specific root tree have respective context values that are subsets of the at least one context value of the selected root node.

8. The computer-implemented method of claim 1, wherein:
   the selected subset of modeling artifacts is a subset of the multiple modeling artifacts that are assigned to the first collaborative business process; and
   at least a second modeling artifact of the multiple modeling artifacts that are assigned to the first collaborative business process and that is not in the selected subset of modeling artifacts is assigned to a second context value and is not assigned to the first context value.

9. The computer-implemented method of claim 1, wherein selecting the subset of the multiple modeling artifacts is performed by the computer system without user input.

10. The computer-implemented method of claim 1, further comprising:
   receiving, at the computer system and from the first computer system after the subset of modeling artifacts have been provided to the first computer system, a second modified modeling artifact which is one of the plurality of modeling artifacts which has been modified by the first computing system;
   determining, by the computer system, that the multiple modeling artifacts assigned to the first collaborative business process do not include a modeling artifact that matches the second modified modeling artifact; and
   assigning, by the computer system in response to determining that the multiple modeling artifacts assigned to the first collaborative business process do not a modeling artifact that matches the second modified modeling artifact, the modified modeling artifact to the first collaborative business process.

11. One or more non-transitory computer readable devices that comprise instructions, that when executed by one or more processors, cause the one or more processors to perform operations comprising:

storing, by a computer system and in a repository that is accessible to other computer systems, multiple modeling artifacts, wherein each of the multiple modeling artifacts is a data component that describes a portion of a collaborative business process;

assigning, by the computer system, each of the multiple modeling artifacts to at least one of a plurality of collaborative business processes that are represented by various combinations of the multiple modeling artifacts;

assigning, by the computer system, each of the multiple modeling artifacts to at least one context value from a collection of context values;

receiving, at the computer system and from a first computer system, a query that is for specialized modeling artifacts and that specifies:
  (i) a first collaborative business process that is from among the plurality of collaborative business processes, and
  (ii) a first context value that is from the collection of context values and that specifies an industry or a geopolitical region of a party that has accessed the first computer system;

selecting, by the computer system and from the repository, a subset of the multiple modeling artifacts that the computer system had assigned to both:
  (iii) the first collaborative business process, and
  (iv) the first context value;

providing, by the computer system and to the first computer system in response to receiving the query from the first computer system, the selected subset of modeling artifacts, wherein the first computer system receives the selected subset of modeling artifacts, and wherein the first computer system modifies a modified modeling artifact that is one of the subset of modeling artifacts;

receiving, at the computer system and from the first computer system after the selected subset of modeling artifacts has been provided to the first computer system, the modified modeling artifact;

determining, by the computer system, that the modified modeling artifact matches another modeling artifact that is stored in the repository and that the computer system has assigned to the first collaborative business process and another context value, the computer system not having assigned the another modeling artifact to the first context value; and assigning, by the computer system in response to determining that the modified modeling artifact matches the another modeling artifact, the another modeling artifact to the first context value.

12. A system comprising:
one or more processors; and
one or more non-transitory computer readable devices that comprise instructions, that when executed by the one or more processors, cause the one or more processors to perform operations comprising:

storing, by a computer system and in a repository that is accessible to other computer systems, multiple modeling artifacts, wherein each of the multiple modeling artifacts is a data component that describes a portion of a collaborative business process;

assigning, by the computer system, each of the multiple modeling artifacts to at least one of a plurality of collaborative business processes that are represented by various combinations of the multiple modeling artifacts;

assigning, by the computer system, each of the multiple modeling artifacts to at least one context value from a collection of context values;

receiving, at the computer system and from a first computer system, a query that is for specialized modeling artifacts and that specifies:
  (i) a first collaborative business process that is from among the plurality of collaborative business processes, and
  (ii) a first context value that is from the collection of context values and that specifies an industry or a geopolitical region of a party that has accessed the first computer system;

selecting, by the computer system and from the repository, a subset of the multiple modeling artifacts that the computer system had assigned to both:
  (iii) the first collaborative business process, and
  (iv) the first context value;

providing, by the computer system and to the first computer system in response to receiving the query from the first computer system, the selected subset of modeling artifacts, wherein the first computer system receives the selected subset of modeling artifacts, and wherein the first computer system modifies a modified modeling artifact that is one of the subset of modeling artifacts;

receiving, at the computer system and from the first computer system after the selected subset of modeling artifacts has been provided to the first computer system, the modified modeling artifact;

determining, by the computer system, that the modified modeling artifact matches another modeling artifact that is stored in the repository and that the computer system has assigned to the first collaborative business process and another context value, the computer system not having assigned the another modeling artifact to the first context value; and assigning, by the computer system in response to determining that the modified modeling artifact matches the another modeling artifact, the another modeling artifact to the first context value.

13. The system of claim 12, wherein the operations further comprise:

receiving, at the computer system and from a second computer system after the assigning, a second query that is for specialized modeling artifacts and that specifies:
  (i) the first collaborative business process, and
  (ii) the first context value;

selecting, by the computer system and from the repository, a second subset of the multiple modeling artifacts that the computer system has assigned to both:
  (iii) the first collaborative business process, and
  (iv) the first context value; and providing, by the computer system and to the second computer system in response to receiving the second query, the second subset of modeling artifacts, wherein the second subset of modeling artifacts includes the another modeling artifact.

14. The system of claim 12, wherein the first collaborative business process is configured to involve multiple communications between at least two entities, and wherein each of the subset of modeling artifacts is configured to be included in at least one of the multiple communications.

15. The system of claim 12, wherein the operations further comprise:
   receiving, by the first computer system, the selected subset of modeling artifacts; and
   modifying, by the first computing system, the modified modeling artifact that is one of the subset of modeling artifacts.

16. The system of claim 12, wherein each of the multiple modeling artifacts conforms to a standardized protocol for defining semantics of contents in electronic communications.

17. The system of claim 12, wherein the multiple modeling artifacts are stored in the repository as a free tree that has a plurality of nodes associated with at least one context value each, wherein the free tree has no root node.

18. The system of claim 17, wherein selecting the subset of the multiple modeling artifacts includes:
   selecting, as a root node, one of the plurality of nodes whose at least one context value matches the first context value; and
   deriving a context-specific root tree from the free tree based on the selected root node, wherein nodes of the context-specific root tree have respective context values that are subsets of the at least one context value of the selected root node.

19. The system of claim 12, wherein:
   the selected subset of modeling artifacts is a subset of the multiple modeling artifacts that are assigned to the first collaborative business process; and
   at least a second modeling artifact of the multiple modeling artifacts that are assigned to the first collaborative business process and that is not in the selected subset of modeling artifacts is assigned to a second context value and is not assigned to the first context value.

20. The system of claim 12, wherein selecting the subset of the multiple modeling artifacts is performed by the computer system without user input.

21. The system of claim 12, wherein the operations further comprise:
   receiving, at the computer system and from the first computer system after the subset of modeling artifacts have been provided to the first computer system, a second modified modeling artifact which is one of the plurality of modeling artifacts which has been modified by the first computing system;
   determining, by the computer system, that the multiple modeling artifacts assigned to the first collaborative business process do not include a modeling artifact that matches the second modified modeling artifact; and
   assigning, by the computer system in response to determining that the multiple modeling artifacts assigned to the first collaborative business process do not a modeling artifact that matches the second modified modeling artifact, the modified modeling artifact to the first collaborative business process.

* * * * *